EARLE A. YOUNG
HAROLD F. BENNETT
INVENTORS

June 19, 1956

E. A. YOUNG ET AL 2,751,149

DIGITAL COMPUTER FOR COMPUTING SQUARE ROOTS
BY SUBTRACTING SUCCESSIVE ODD NUMBERS

Filed Jan. 24, 1951

*EARLE A. YOUNG*
*HAROLD F. BENNETT*
INVENTORS

BY
ATTORNEYS

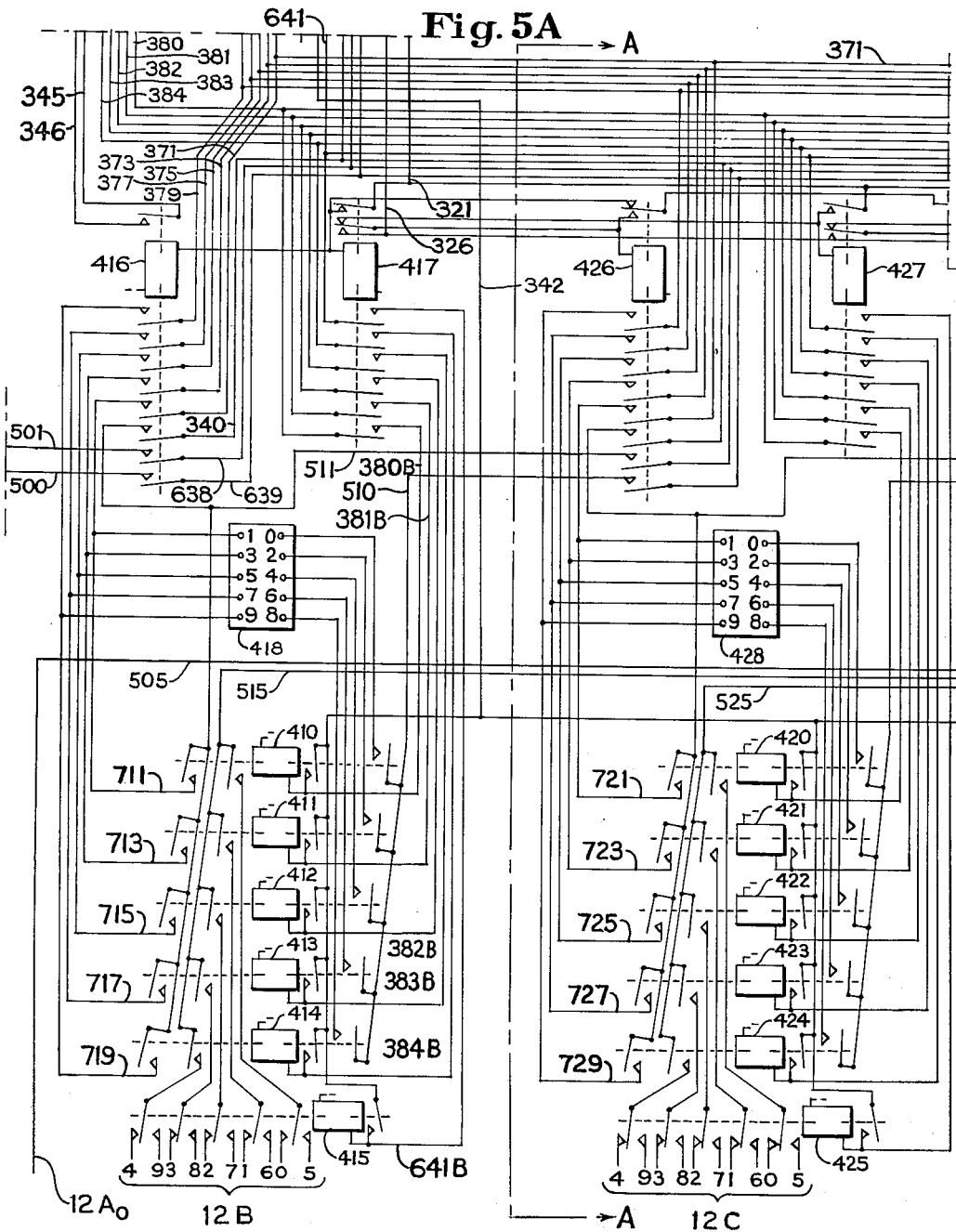

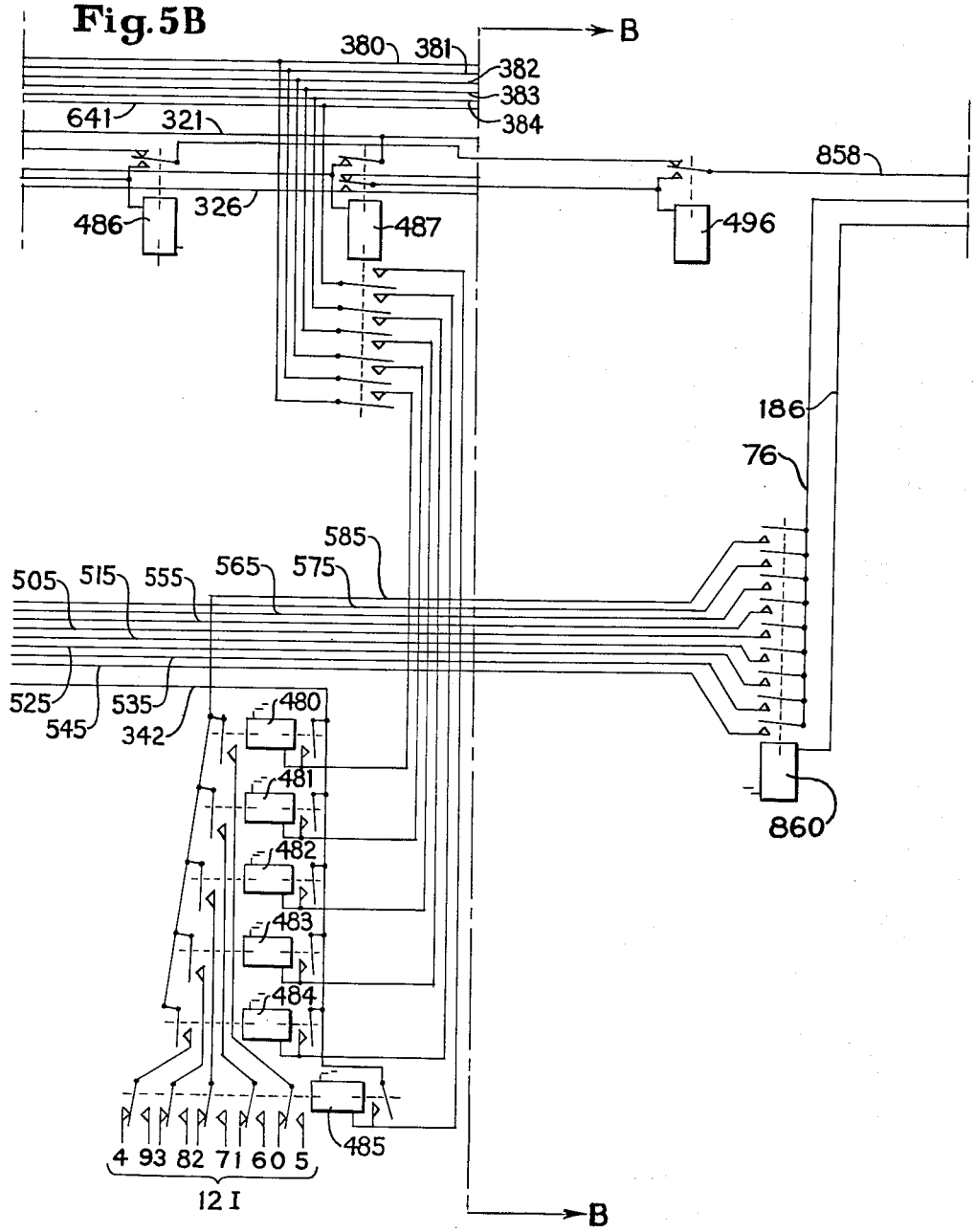

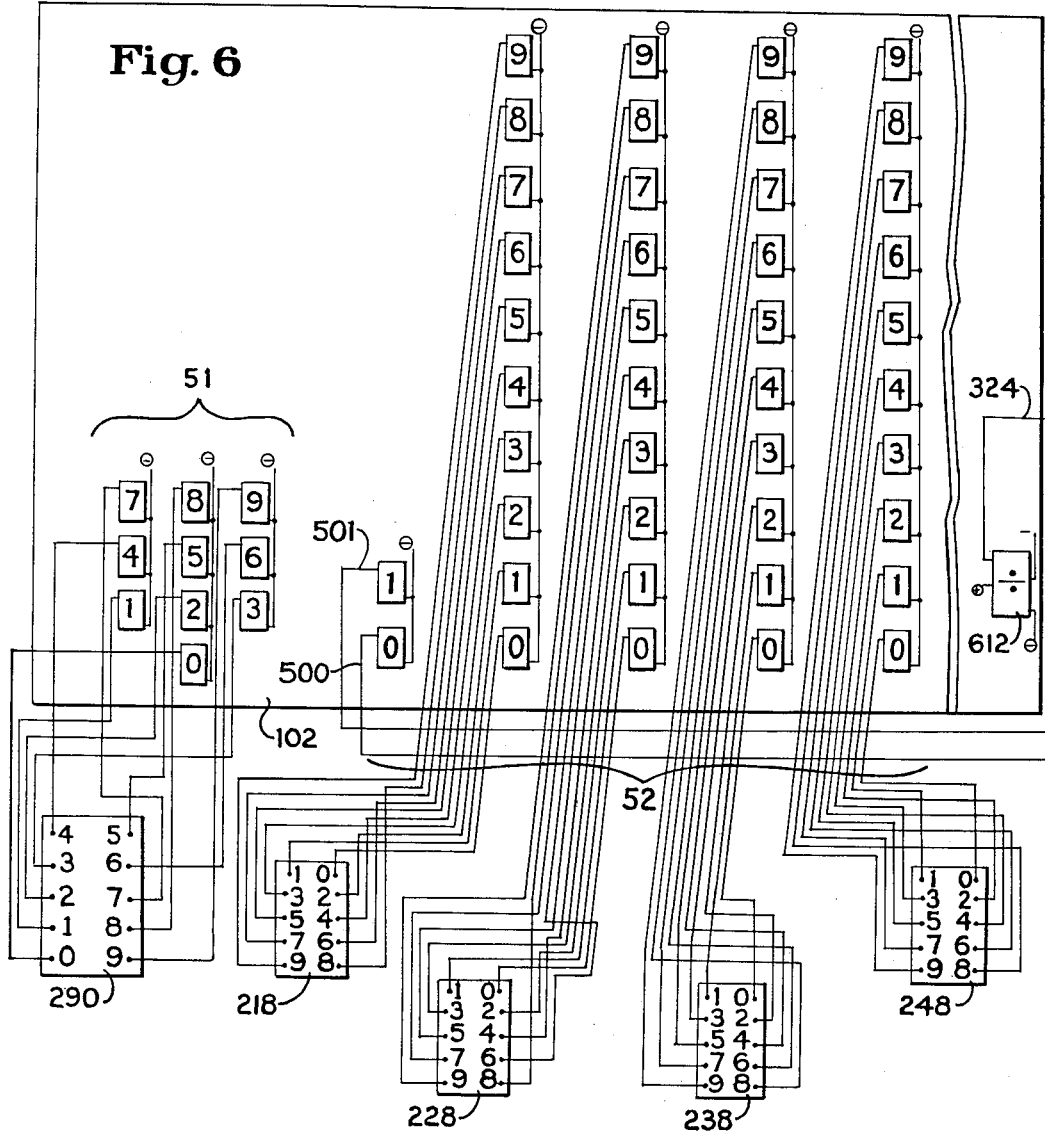

June 19, 1956 — E. A. YOUNG ET AL — 2,751,149
DIGITAL COMPUTER FOR COMPUTING SQUARE ROOTS
BY SUBTRACTING SUCCESSIVE ODD NUMBERS

*EARLE A. YOUNG*
*HAROLD F. BENNETT*
Inventors

Attorneys

EARLE A. YOUNG
HAROLD F. BENNETT
INVENTORS

EARLE A. YOUNG
HAROLD F. BENNETT
INVENTORS

Fig. 14

| RELAY | WIRE | PREPARTY INTERVAL | SUBTRACTION CYCLES | | | | NEUTRAL | ADD. | NEUTRAL (SHIFT) |
|---|---|---|---|---|---|---|---|---|---|
| | | | 1 ST. | 2 ND. | 3 RD. | OVERDRAFT | | | |
| 354 | 319 | | | | | | | | |
| 356 | | | | | | | | | |
| | 324 | | | | | | | | |
| | 342 | | | | | | | | |
| | 320 | | | | | | | | |
| | 323 | | | | | | | | |
| | 325 | | | | | | | | |
| | 326 | | | | | | | | |
| | 327 | | | | | | | | |
| 357 | | | | | | | | | |
| 358 | | | | | | | | | |
| | 328 | | | | | | | | |
| | 330 | | | | | | | | |
| | 331 | | | | | | | | |
| | 332 | | | | | | | | |
| | 333 | | | | | | | | |
| | 334 | | | | | | | | |
| | 335 | | | | | | | | |
| | 321 | | | | | | | | |
| 360 | | | | | | | | | |
| 361 | | | | | | | | | |
| 362 | | | | | | | | | |
| 363 | | | | | | | | | |
| 364 | | | | | | | | | |
| 365 | | | | | | | | | |
| | 271 | | | | | | | | |
| | 273 | | | | | | | | |
| | 275 | | | | | | | | |
| | 277 | | | | | | | | |
| | 279 | | | | | | | | |
| | 339 | | | | | | | | |
| | 340 | | | | | | | | |
| | 283 | | | | | | | | |
| 355 | | | | | | | | | |

EARLE A. YOUNG
HAROLD F. BENNETT
INVENTORS

June 19, 1956     E. A. YOUNG ET AL     2,751,149
DIGITAL COMPUTER FOR COMPUTING SQUARE ROOTS
BY SUBTRACTING SUCCESSIVE ODD NUMBERS
Filed Jan. 24, 1951     11 Sheets-Sheet 11

EARLE A. YOUNG
HAROLD F. BENNETT
INVENTORS

BY

ATTORNEYS

United States Patent Office 2,751,149
Patented June 19, 1956

2,751,149

DIGITAL COMPUTER FOR COMPUTING SQUARE ROOTS BY SUBTRACTING SUCCESSIVE ODD NUMBERS

Earle A. Young and Harold F. Bennett, Rochester, N. Y., assignors to Eastman Kodak Company, Rochester, N. Y., a corporation of New Jersey Application January 24, 1951, Serial No. 207,562

16 Claims. (Cl. 235—61)

This invention relates to calculating machines.

The broad object of the invention is to provide a computer for calculating the square root of a number.

A more particular object of the invention is to provide a computer for calculating the square root of a number by subtracting successive odd numbers.

Another object of the invention is to provide control equipment which when combined with a key-set mechanical digital calculator constitutes a computer for calculating the square root of a number pre-entered into the register of said calculating machine.

An object of a particular form of the invention is to provide a computer having a register and adapted to compute the square root of the complement of a number pre-entered into the register.

An object of another form of the invention is to provide a computer having a register and adapted to selectively compute the square root of a number and of the complement of a number pre-entered into the register.

According to one feature of the invention control means are provided for entering successive odd numbers (e. g. 1, 3, 5, 7, 9, 11) into the keyboard of a key-set calculator.

According to another feature of the invention control means are provided for a key-set calculator of a type provided with means for dividing a dividend by a divisor by a process of successive subtractions, which control means is adapted to change the divisor between each subtraction and the next.

According to still another feature of the invention control means are provided for a key-set calculator of a type adapted to perform a series of subtractions of a subtrahend from a minuend, to stop the subtractions and perform an addition when an overdraft occurs, to shift the relative decimal positions of the subtrahend and the minuend, and then to start a second series of subtractions, said control means being adapted to change the subtrahend through a series of successive odd-numbered values in synchronism with each series of subtractions.

A further object of the invention is to provide control equipment for a mechanical calculator and number storage means associated therewith for calculating the square root of a number automatically in response to the closing of a starting switch and for storing the square root so computed for transmission over number circuits at a later time.

A particular object of the invention is to provide an automatic square root computer which is adapted to function as a unit of an automatic sequence-controlled computer under the control of the control circuit thereof.

An object of a particular form of the invention is to provide a computer adapted to selectively compute the square root of a number and the quotient of two numbers.

One such sequence-controlled computer is described in a cofiled application, Serial No. 207,561, by Bennett, Young, and Hoag, now Patent No. 2,651,458.

Most of the desk type calculators now on the market multiply by repeated additions and divide by repeated subtractions, the product register (which is also the dividend register) being mounted on a carriage for shifting to different decimal positions. In the detailed description herein given of one form of the invention it is assumed that the calculator is of this broad type and meets the following requirements:

(1) The calculator is provided with means for automatically carrying out the process of division by repeated subtractions when a division control such as a key or lever is operated. For this process the dividend is set up in the product register and the divisor is set up in the keyboard.

(2) There is an interval during each subtraction cycle of the division process when the divisor can be changed, for example, by depressing another key in the keyboard.

There are at least two machines on the market which meet all these requirements. By slight modifications the invention is applied to other calculators including adding machines.

The process of automatic division is well known and will not be described in detail here. A knowledge of the steps of this process is necessary, however, for a clear understanding of the invention.

According to the present invention means are provided for changing the divisor repeatedly according to a predetermined pattern during an automatic division operation. These means include electromagnetic solenoids mounted over certain keys of the keyboard and over the division control key for depressing these keys upon receiving suitable electrical pulses, a few minor modifications are made in the mechanism of the calculator, and a system of relays is provided for controlling the changes in the divisor during division and, optionally, for storing the successively calculated digits of the square root.

It is customary to call the divisor a "trial divisor" in square root computations, but for brevity it is here called simply a "divisor" or a "subtrahend."

*Why the subtrahend is always an odd number.* A little background material is here provided which, it is believed, will aid in a clearer understanding of the description of the invention which begins in the next section.

It is pointed out in books on interpolation and related subjects that in the series of squares of successive numbers the difference between each square and the next is an odd number and more specifically the difference between $x^2$ and $(x+1)^2$ is $(2x+1)$. This is easily shown by writing these square out in full and subtracting, as follows:

$$\begin{aligned}(x+1)^2 &= x^2+2x+1\\x^2 &= x^2\\\hline(x+1)^2-x^2 &= (2x+1)\end{aligned}$$

and this relation holds for any positive or negative value of $x$.

As a specific example, a portion of the series of natural numbers, their squares, and the difference between each square and the next smaller square may be set out as follows:

| Numbers | Squares | Differences |
|---------|---------|-------------|
| 1 | 1 | 1 |
| 2 | 4 | 3 |
| 3 | 9 | 5 |
| 4 | 16 | 7 |
| 5 | 25 | 9 |
| 6 | 36 | 11 |
| 7 | 49 | 13 |
| 8 | 64 | 15 |
| 9 | 81 | 17 |
| 10 | 100 | 19 |

Furthermore, it will be observed that the sum of all the differences from the top of the third column down to any one that may be specified is equal to the square (i. e., the entry in the middle column) on the same line with the specified difference, e. g. 1+3+5+7+9+11=36. Moreover, it will be observed that the count of the differences so added is equal to the number in the first column on the same line with the specified difference. This count is 6 in the example just given in full, and, of course, $6^2=36$.

To apply this to the computing of square roots on a calculating machine, one starts with a number in the dividend register. Then, instead of successively subtracting a fixed number as in the division process, the successive odd numbers making up the series of differences shown in part in the above table are successively subtracted until an overdraft occurs, and the square root of the number originally in the dividend register has thus been computed with an accuracy within one unit. This is because (as just pointed out) the sum of all the differences up to any given point is equal to the square of the number (counted) of such differences. That is, to say, when the first $x$ successive differences have been subtracted without an overdraft, this is equivalent to subtracting $x^2$ without an overdraft, showing that the original number is equal to or larger than $x^2$. Then if the next difference is subtracted and an overdraft occurs $(x+1)$, differences will have been subtracted, equivalent to subtracting $(x+1)^2$. This may be summarized by saying $$x \leq \sqrt{N} < (x+1)$$

where N is the original number, hence the square root will have been computed within one unit accuracy.

It is understood, of course, that most calculating machines now on the market immediately perform one addition after an overdraft occurs during the division operation to correct the overdraft.

However, just as in division it is not practical to divide 21,178,405 by 4601 by actually making 4604 (or 4603) subtractions, so in computing square roots, one would not compute the square root of 21,178,405 by subtracting 4603 (or 4602) successive differences. Rather, one would "shift the decimal point" or stated another way one would subtract values of a different decimal order. In the division example one would subtract 4,601,000 four times, 460,100 six times and 4601 three times, not counting the subtractions during which overdrafts occur. Similarly, in the square root example, according to the invention, the decimal point is shifted and one subtracts the differences 1,000,000, 3,000,000, 5,000,000, and 7,000,000. (The first overdraft occurs during the next subtraction and is then corrected by an addition.) This is a net of four subtractions, totaling 16,000,000, which is equal to $4000^2$. This has the same effect numerically as subtracting the first 4000 odd numbers making up the series of differences previously discussed but is, of course, much quicker.

From this point on, it would be possible but not practical to proceed by subtracting the series of successive differences previously discussed beginning with $$(4001)^2-(4000)^2=2\times 4000+1=8001$$

and making 602 subtractions before the overdraft occurs. Again, however, according to the invention, a quicker method is adopted at this point and one shifts to still another series of differences $$(4100)^2-(4000)^2, (4200)^2-(4100)^2$$

etc., that is 8,100,000, 8,300,000, etc., in which series six subtractions would be made without an overdraft, showing that the square root of 21,178,405 is greater than 4600. By now it should be obvious that according to the invention the next series of differences to be tried would be 92,100, 92,300, etc., but that an overdraft would occur during the very first subtraction, showing that the square root is less than 4610. Finally, by subtracting 9201 and 9203 and finding that the remainder is smaller than 9205, the square root will have been found to be between 4602 and 4603.

The question may arise as to whether 1,000,000, 3,000,000, 810,000, 830,000, 92,100, and in general $(2x+1)\cdot 10^n$, where $n$ is an integer greater than 1, are actually odd numbers or whether, for correctness, they should be called even numbers. On this basis it may further be questioned whether this method of computing square roots may properly be described as comprising a process of subtracting a series of successive odd numbers. These questions are matters of terminology. It will be recognized that 1,000,000, 3,000,000 and 5,000,000 are odd numbers of millions, that 810,000 and 830,000 are odd numbers of ten-thousands, and that in general $$(2x+1)\cdot 10^n$$

is an odd number in some decimal order or denomination, which may be designated as the nth decimal order, whether $n$ is a positive or negative integer or zero. This is what is meant in this specification and in the appended claims when the term "odd number" is used.

On still other grounds, it may be questioned whether or not the subtrahend is necessarily always an odd number as above defined when computing square roots. The answer is that it is not necessarily so, but that the present invention is confined to computing routines in which only odd numbers are used as subtrahends. By way of example of alternative methods, it is possible to compute square roots by subtracting successive differences between squares of successive even numbers. A few differences of this series are given by way of example, in a form corresponding to that used above:

| Number | Square | Difference |
| --- | --- | --- |
| 2 | 4 | 4 |
| 4 | 16 | 12 |
| 6 | 36 | 20 |
| 8 | 64 | 28 |
| ... | ... | ... |
| $(x+2)$ | $(x^2+4x+4)$ | $(4x+4)$ |

According to this scheme (not used in the present invention) the square root of 21,178,405 would be computed by subtracting 4,000,000 and 12,000,000 in a first series of subtractions, 1,640,000, 1,720,000, and 1,800,000 in the second series, nothing in the third series, and 18,404 in the fourth series, not counting the subtractions during which overdrafts occur. The remainder is less than the next difference 18,412 in this last series, showing that the square root is between 4602 and 4604. The number of subtractions in the successive series are 2, 3, 0 and 1. The square root would be obtained during a machine computation by doubling each of these counts and writing them as successive digits of a decimal number, namely 4602.

The reasons this scheme is not used and hence the reasons that only odd numbers are used as subtrahends are as follows: (1) Calculating machines as now available on the market are designed to count the number of subtractions directly and not to count double the number of subtractions. (2) The full series of subtractions in one decimal order according to this alternative scheme runs through some such series of number-endings as 004, 012, 020, 028, 036, 044, 052, 060, 068, and 076, involving 5 different keyboard keys in the units order and eight different keys in the tens order, whereas the full series of subtractions in one decimal order according to the invention is simpler since it runs through a series of number-endings such as 001, 003, 005, 007, 009, 011, 013, 015, 017, and 019 involving only two keys in the tens order, thus making possible a simpler control system. (3) After computing through a given number of decimal orders, such as four as in the above example, the square root is known with greater accuracy in the scheme according to the invention than in the alternative scheme.

*Pattern of change in the divisor.*—The pattern according to which the divisor is changed is well known and is widely used for the purpose of computing square roots by manual operation of the calculator. It depends upon the algebraic identity $$(x+d)^2 = x^2 + d(2x+d)$$

Applying this to the square root process, $x$ is the trial square root before any specified change, $(x+d)$ is the trial root after the change, and $d$ is always a unit in one of the decimal orders. At the first subtraction, $x$ is considered as zero and $d$ is normally a power of 10 such that $d^2$ is larger than one one-hundredth of the number whose root is to be computed. After the first subtraction, $d$ is the largest power of 10 that is possible or at least that has not been tried and proven too large by comparison with the number whose square root is being computed. The machine makes this comparison by subtracting and detecting an overdraft or absence thereof. At any point in the computation, the sum of all the subtrahends previously subtracted is equal to the current $x^2$, and the current subtrahend is $d(2x+d)$. Then if no overdraft occurs, $(x+d)$ of the current subtraction becomes $x$ for the next subtraction thereafter. On the other hand, an overdraft, if it occurs, is corrected by re-adding the last subtrahend, whereupon a "$d$" is tried which is one-tenth as large. It will be clear that $x$ has no non-zero digits of lower decimal order than $d$ at any time, and accordingly it is readily seen by substituting successive numerical values that the successive values of $d(2x+d)$ are successive odd numbers in one decimal order and successive odd numbers in a lower decimal order after the occurrence of an overdraft. The count of the successive subtractions in each series exclusive of the overdraft gives a digit of the square root.

The process is best explained in detail by way of an example, for instance if the square root of 66,049 is computed, the successive steps are as shown in Table 1. This is not exactly the same in every detail as the process carried out by the form of the invention described in detail herein, but illustrates the principles involved.

TABLE 1

| Step No. | $x$ | $d$ | $(x+d)$ | $d(2x+d)$ | Remainder |
|---|---|---|---|---|---|
| 1 | 0 | 100 | 100 | 10,000 | 66,049. |
| 2 | 100 | 100 | 200 | 30,000 | 56,049. |
| 2a | (200) | (100) | (300) | 50,000 | 26,049. |
| 2b | | | | (Add 50,000) | Overdraft. |
| 2c | | | | | Overdraft Corrected. |
|  | | | | | Carriage shift. |
| 3 | 200 | 10 | 210 | 4,100 | 21,949. |
| 4 | 210 | 10 | 220 | 4,300 | 17,649. |
| 5 | 220 | 10 | 230 | 4,500 | 13,149. |
| 6 | 230 | 10 | 240 | 4,700 | 8,449. |
| 7 | 240 | 10 | 250 | 4,900 | 3,549. |
| 7a | (250) | (10) | (260) | 5,100 | Overdraft. |
| 7b | | | | (Add 5,100) | Overdraft Corrected. |
| 7c | | | | | Carriage shift. |
| 8 | 250 | 1 | 251 | 501 | 3,048. |
| 9 | 251 | 1 | 252 | 503 | 2,545. |
| 10 | 252 | 1 | 253 | 505 | 2,040. |
| 11 | 253 | 1 | 254 | 507 | 1,533. |
| 12 | 254 | 1 | 255 | 509 | 1,024. |
| 13 | 255 | 1 | 256 | 511 | 513. |
| 14 | 256 | 1 | 257 | 513 | 000. |
| 14a | 257 | 1 | 258 | 515 | Overdraft. |
| 14b | | | | (Add 515) | Overdraft Corrected. |

Counting 2, 5, and 7 subtractions in the respective series gives 257 as the square root of 66,049.

Since this comes out even, nothing more of significance happens except overdrafting and correcting the overdrafts as the carriage moves to its final position and the operation stops.

*Complemental method.*—Some operators, when manually operating a calculating machine, sometimes follow another pattern of changes in the divisor which is quicker in some cases and which may be explained as follows. When it appears that the next digit of the square root is going to be greater than 5, the overdraft is not corrected, but instead the square root is approached from the other direction. In the above example, for instance, an operator could omit the step of correcting the overdraft in the first carriage position and instead could shift then add successively changing numbers until a positive balance is obtained. This means that the value of $d$ is negative during this series of steps. According to this method, the following steps are substituted in the example given in Table 1:

| | $x$ | $d$ | $(x+d)$ | $d(2x+d)$ | Remainder |
|---|---|---|---|---|---|
| 2' | 100 | 100 | 200 | 30,000 | 26,049. |
| 2a' | 200 | 100 | 300 | 50,000 | −23,951. |
| 2c' | | | | | Carriage shift. |
| 3' | 300 | −10 | 290 | −5,900 | −18,051. |
| 4' | 290 | −10 | 280 | −5,700 | −12,351. |
| 5' | 280 | −10 | 270 | −5,500 | −6,851. |
| 6' | 270 | −10 | 260 | −5,300 | −1,551. |
| 7' | 260 | −10 | 250 | −5,100 | +3,549. |

This leaves the same remainder as step 7 or step 7b and is followed by steps 7c to 14b as before.

This example has been given as a preliminary to the description of the complemental square root method, and to aid in the understanding of that method. It is evident that an additional modification of the desk calculator would be required to make it do successive additions automatically until a positive balance appears. What has not been heretofore recognized, however, is that the original number can be put into the carriage register negatively, that the first operation can be a separately controlled addition so as to result in a positive balance, and that the successive additions above indicated will then be performed by the machine as subtractions, and thus the rest of the process after the initial addition can be automatic. This is very nearly the routine that is followed in this second form of the invention described below.

For example, the square root of 558,009 is computed by the complemental method as shown in Table 2:

TABLE 2

| Step No. | $x$ | $d$ | $(x+d)$ | $d(2x+d)$ | Remainder |
|---|---|---|---|---|---|
| (Initially subtract 558,009) | | | | | −558,009. |
| 1 (add) | 0 | 1,000 | 1,000 | 1,000,000 | 441,991. |
| 2 (subtract) | 1,000 | −100 | 900 | 190,000 | 251,991. |
| 3 (subtract) | 900 | −100 | 800 | 170,000 | 81,991. |
| 3a (subtract) | (800) | (−100) | (700) | 150,000 | Overdraft. |
| 3b (add) | | | | (150,000) | Overdraft Corrected. |
| 3c | | | | | Carriage Shifts. |
| 4 (subtract) | 800 | −10 | 790 | 15,900 | 66,091. |
| 5 (subtract) | 790 | −10 | 780 | 15,700 | 50,391. |
| 6 (subtract) | 780 | −10 | 770 | 15,500 | 34,891. |
| 7 (subtract) | 770 | −10 | 760 | 15,300 | 19,591. |
| 8 (subtract) | 760 | −10 | 750 | 15,100 | 4,491 |
| 8a (subtract) | (750) | (−10) | (740) | 14,900 | Overdraft. |
| 8b (add) | | | | (14,900) | Overdraft Corrected. |
| 8c | | | | | Carriage Shifts. |
| 9 (subtract) | 750 | −1 | 749 | 1,499 | 2,992. |
| 10 (subtract) | 749 | −1 | 748 | 1,497 | 1,495. |
| 11 (subtract) | 748 | −1 | 747 | 1,495 | 0,000. |
| 11a | | | | | Overdraft as before. |

This process will be referred to as the complemental square root process, since it operates primarily in terms of the complements of numbers. On the average it is shorter than the ordinary method if the square root being computed starts with the digits 5.4 or larger. The counts of the several series of subtractions (excluding the overdraft) gives 253, the complement of the square root of the number, 558,009. This complemental process has been found to be particularly useful in computing cosines of angles from the sines. The well known formula is $$\cos a = \sqrt{1 - \sin^2 a}$$

The usual computing steps include squaring the sine, subtracting from unity, and extracting the square root of the remainder. Adapting the complemental process above outlined to this problem, however, $\sin^2 a$ is preset in the carriage register (e. g. by a positive multiplication) thus eliminating step 1 of the full complemental process shown above, and the automatic computation is started by subtracting 0.19, 0.17, 0.15 etc.

*Comparison of ordinary and complemental processes.*—Tables 3 to 6 show a step-by-step comparison of the ordinary and complemental processes as regards the pattern of changes in the divisor, taking the first two columns of the keyboard as an example. The pattern of changes is rather complex, but can be systematized according to whether the overdraft occurs before the fifth (Table 3) at the fifth (Table 4), at the sixth to ninth (Table 5), or at the tenth subtraction (Table 6). These four tables give four examples, one illustrating each of these four cases. It may be noted here that to carry out the following routine the operation of the desk calculator is modified as described in detail below to give an extra neutral cycle after each overdraft. This is done because the overdraft is detecter too late to prevent the changing of the divisor which should not be changed at this time. The divisor is changed back again during the neutral cycle.

In Tables 3, 4, 5 and 6 the steps or machine cycles are numbered at the left, and the number which is in the keyboard at the beginning of the cycle according to each of the two processes is given in the respective column.

TABLE 3

| Step No. | Ordinary Process | Complemental Process |
| --- | --- | --- |
| 1 | 01 Subtract | 19 |
| 2 | 03 Subtract | 17 |
| 3 | 05 Overdraft | 15 |
| 3a | 07 Neutral | 13 |
| 3b | 05 Overdraft Corrected | 15 |
| 3c | 05 Carriage Shifts | 15 |
| 4 | 041 Next column, subtract | 159 |

TABLE 4

| Step No. | Ordinary Process | Complemental Process |
| --- | --- | --- |
| 1 | 01 Subtract | 19 |
| 2 | 03 Subtract | 17 |
| 3 | 05 Subtract | 15 |
| 4 | 07 Subtract | 13 |
| 5 | 09 Overdraft | 11 |
| 5a | 11 Neutral | 09 |
| 5b | 09 Overdraft Corrected | 11 |
| 5c | 09 Carriage Shifts | 11 |
| 6 | 081 Next Column, subtract | 119 |

TABLE 5

| Step No. | Ordinary Process | Complemental Process |
| --- | --- | --- |
| 1 | 01 Subtract | 19 |
| 2 | 03 Subtract | 17 |
| 3 | 05 Subtract | 15 |
| 4 | 07 Subtract | 13 |
| 5 | 09 Subtract | 11 |
| 6 | 11 Subtract | 09 |
| 7 | 13 Subtract | 07 |
| 8 | 15 Overdraft | 05 |
| 8a | 17 Neutral | 03 |
| 8b | 15 Overdraft Corrected | 05 |
| 8c | 15 Carriage Shifts | 05 |
| 9 | 141 Next column, subtract | 059 |

TABLE 6

| Step No. | Ordinary Process | Complemental Process |
| --- | --- | --- |
| 1 | 01 Subtract | 19 |
| 2 | 03 Subtract | 17 |
| 3 | 05 Subtract | 15 |
| 4 | 07 Subtract | 13 |
| 5 | 09 Subtract | 11 |
| 6 | 11 Subtract | 09 |
| 7 | 13 Subtract | 07 |
| 8 | 15 Subtract | 05 |
| 9 | 17 Subtract | 03 |
| 10 | 19 Overdraft | 01 |
| 10a | 19 Neutral | 01 |
| 10b | 19 Overdraft Corrected | 01 |
| 10c | 19 Carriage Shifts | 01 |
| 11 | 181 Next column, subtract | 019 |

As shown in Table 4, an ovedraft at the fifth subtraction is a special case because the left-hand column changes from 0 to 1 (or 1 to 0) then changes back again from 1 to 0 (or 0 to 1). An overdraft at the tenth subtraction (Table 6) is a special case because no further changes are made in either column. If no overdraft occurs before the eleventh subtraction then something is wrong and the machine should be stopped. Usually what is wrong is that the process was started with the carriage in the wrong decimal position.

It will be noted that while the number in the second column is changed at each cycle until the overdraft, the only numbers that appear in the left-hand column are 0 and 1.

Similarly, after the carriage shifts once, the third column is changed repeatedly, but in the second column two digits at the most are used, the odd digit subtracted during the overdraft cycle and the next smaller even digit, and similarly for the fourth and further columns. The terminology that will be used to describe this process is as follows. The column in which the number is being changed at each cycle is called the "present column" and the column on its left the "previous column." When the carriage shifts, the "present column" becomes the "previous column" and the next column on the right becomes the "present column." The columns here referred to are actual columns of keys in the main keyboard of the machine.

According to the form of the present invention shown in detail herein, the relay system by which these steps are controlled comprises a number of general control relays, a counting chain for counting the subtractions in each carriage position, a group of storage relays associated with each of a plurality of carriage positions for storing the last odd digit subtracted, the next smaller even digit, and optionally also the digit representing the number of subtractions in that position, and a trunking chain for connecting the counting chain to each storage group and to each column of the keyboard solenoids in succession. The construction and operation of a preferred form of the relay system will be described in more detail with reference to the accompanying drawings in which:

Fig. 5 (5A and 5B) shows the trunking relays and the storage relays.

Fig. 6 is a wiring diagram of the solenoids which operate the keys of the desk calculator.

Figs. 14, 15 and 16 are time-charts to aid in an understanding of the operation of the invention.

General plan

Figure 1:
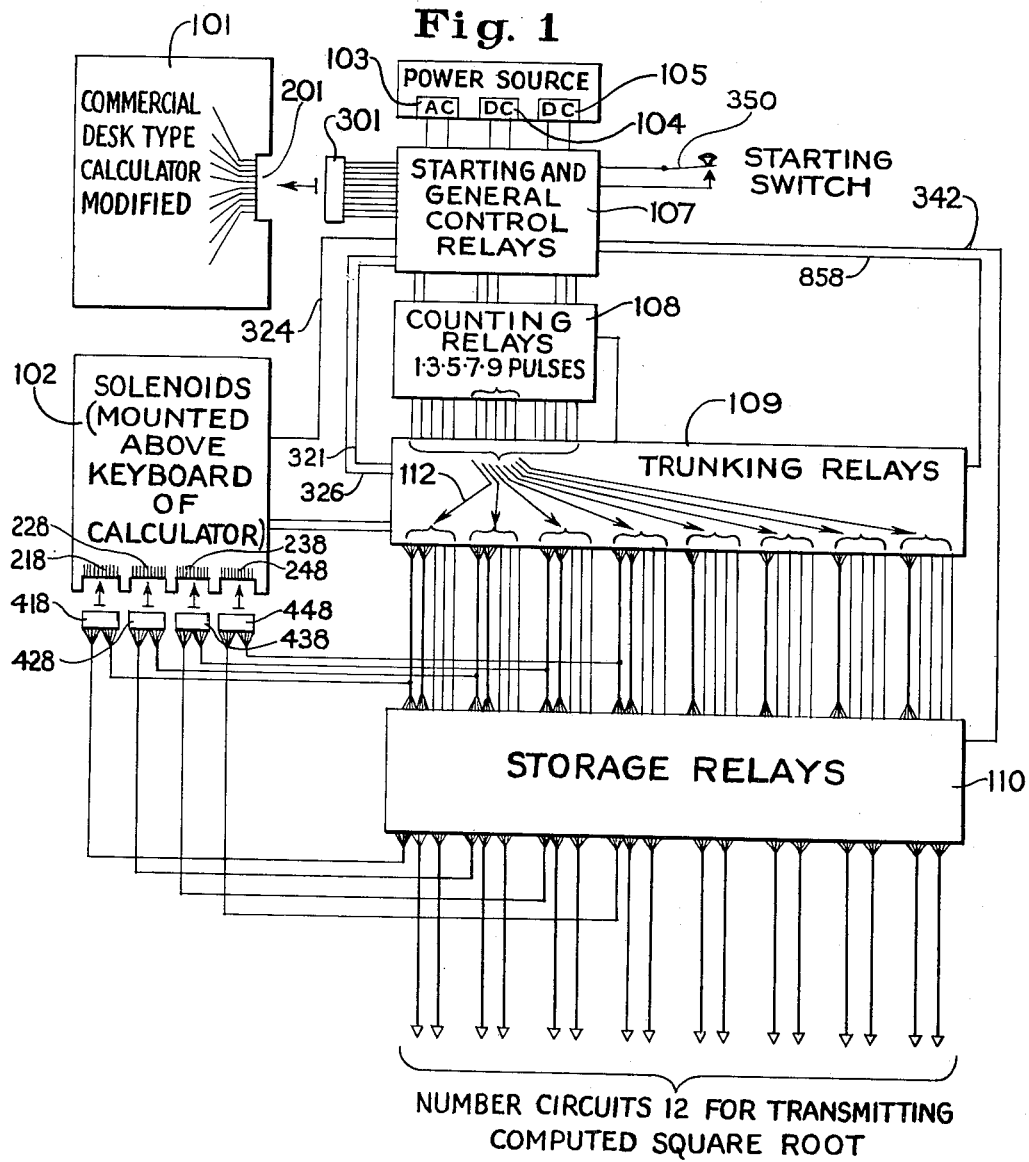
Fig. 1 is a chart showing the several units of the machine and connects therebetween.
Figure 2:
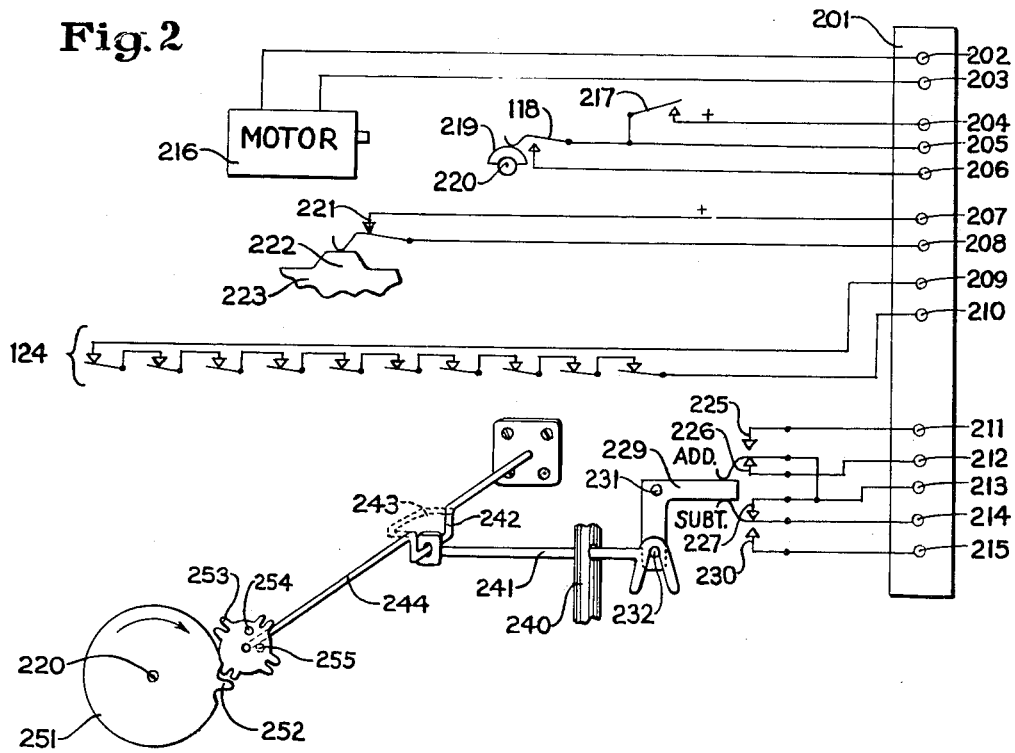
Fig. 2 shows schematically the necessary modifications of the desk calculator.

Fig. 1 is a schematic diagram of a preferred form of the invention and shows the relationships among the several sections or units of the machine. A commercial desk type calculator 101 modified as shown in Fig. 2 and as shown in the above-mentioned copending application is provided for performing the basic arithmetical functions. The calculator is provided with a multiple jack 201 into which is fitted the plug 301 for making the electrical connections with the rest of the circuit. The use of jack-and-plug connections facilitates the removal of the calculator and the substitution of another machine in the event of mechanical failure.

A bank of solenoids 102 is mounted over the keyboard of the calculator to depress the numeral keys and the automatic division key. These solenoids are described in greater detail in the copending application above mentioned. Here too it is convenient to make connections between this unit and the rest of the system through multiple jacks 218, 228, 238 and 248, into which are fitted the plugs 418, 428, 438 and 448. The circuit of the solenoid bank is shown in more detail in Fig. 6.

Three power sources are provided, an A. C. source 103 for the motor of the calculator, a D. C. source 104 for energizing the relays and a second D. C. source 105 for energizing the solenoids. The D. C. sources are conveniently 3-phase full-wave rectifiers. In the detailed drawings, the wires to the minus posts of the D. C. power sources are usually omitted and indicated by a short line labelled with a minus sign.

A starting switch 350 is provided for starting the automatic operation according to the invention. This is a manually operated switch when the square root computer is used independently and manually started, and it is a switch on a sequence control relay or the like when the square root computer is a part of a larger sequence-controlled machine. The starting and general control relays 107 are shown in more detail in Fig. 3 and in the upper third of Fig. 4. This relay system exercises general control over the operations of the other units. In particular, when the starting switch 350 is closed, these relays detect whether the calculator 101 and the trunking relays 109 are in the proper condition for the computation to start before sending a pulse over wire 324 to energize the solenoid which depresses the automatic division key and starts the operation. In the form of the invention in which the square root computer is a complete unit in itself, the control relays supply locking voltage via wire 342 to the storage relays 110 at all times except for a moment when the computation is first starting. When it is a unit in a sequence-controlled computer, this locking voltage is optionally applied under the direct control of the sequence control circuit.

The calculator 101, as will be shown in detail, emits a pulse during each revolution or cycle and also signals whether each cycle is a subtraction, an addition or a neutral cycle. The control relays modify these pulses from the calculating machine and distribute them to the other parts of the machine to control the operations thereof. A chain of counting relays 108 is provided for counting the number of subtractions in a series as described above, for distributing the pulses to the 1, 3, 5, 7 and 9 keyboard solenoids of the "present" column, for timing a pulse to the "previous" column after the fifth subtraction of a series, and for signaling to the storage relays the count of the number of subtractions, all under the control of the general control relays. A chain of trunking relays 109 and several sets of storage relays 110 are provided. The trunking relays connect the counting relays 108 to the several sets of storage relays in turn and also to the corresponding columns of the keyboard solenoids 102 as indicated by arrows 112 for distributing the 1, 3, 5, 7, 9 pulses to the proper keyboard column and for storing the count of the subtractions in the proper set of storage relays. The storage relays store the numbers thus received until released by the removal of the locking voltage from wire 342, and at any time while the numbers are so stored, they may be transmitted over the number circuits 12 at the option of the operator when the invention is made up as an independent unit or under the control of the sequence control when the invention is made up as a unit in a sequence-controlled computer. The number may be transmitted to any number-receiving apparatus such as an electrically-operated typewriter or to the keyboard of the same calculator or of another calculator. Several methods of transmitting numbers electrically are known and two in particular are described in the above-mentioned copending application.

In Fig. 1 each of the lines which are shown as fanning out at one end or at both ends represents a bundle of five wires and each of the arrows 112 represents a group of wires and/or switches by which the counting relays are connected to one set of the storage relays.

The apparatus as shown schematically in Fig. 1 and as shown in more detail in the following figures is designed for computing a square root to eight significant figures. Of course, it may be made up for computing a larger or smaller number of significant figures if desired. It is well known, however, and may be shown mathematically or proven by experiment, that it is only required to change the trial divisor in about half as many columns of the keyboard as there are significant figures in the square root to be computed. Accordingly, the circuit is shown for energizing solenoids corresponding to four columns of the keyboard. When the invention is made up as an independent unit, these four columns of solenoids and two solenoids for the 0 and 1 key in the next column to the left are all the keyboard solenoids that have to be provided in the solenoid bank 102. However, when the invention is made up as a unit in a larger sequence-controlled computer and preferably in any case, solenoids are provided for the full number of significant figures for which the machine is designed, as is shown in the copending application.

The error introduced by stopping the changing of the subtrahend after $m$ significant figures of the square root have been computed is found as follows: Suppose the square root of a number N is being computed such that:

$$10^{2n} \leq N < 10^{2n+2}$$

and hence:

$$10^n \leq \sqrt{N} < 10^{n+1}$$

Let $x_m$ be the approximate square root computed to $m$ places, i. e., when the $m$th overdraft has just been rectified, and define $e$ as the difference $(\sqrt{N} - x_m)$, between the exact square root and this approximate square root. Then, in the ordinary square root computation:

$$10^n \leq x_m \leq \sqrt{N} < 10^{n+1}$$
$$0 \leq e < 10^{n-m+1}$$

and $$(x_m+e)^2 = x_m^2 + 2x_m e + e^2 = N$$

or $$2x_m e + e^2 = N - x_m^2 = \text{the remainder in the register}$$

If $e$ were to be approximately computed by dividing the remainder $N - x_m^2$ by $2x_m$, the resulting computed value of $e$ is $$e + \frac{e^2}{2x_m} = \frac{N - x_m^2}{2x_m}$$

in which case the error is obviously $$\frac{e^2}{2x_m}$$

and the maximum error is less than $$\tfrac{1}{2}\frac{(\max e)^2}{\min x_m} = \frac{10^{2(n-m+1)}}{2 \times 10^n} = 5 \times 10^{n-2m+1}$$

it is preferred because it is simpler and more accurate, however, to allow the last subtrahend $(2x_m + 10^{n-m+1})$ to remain in the keyboard as a divisor, in which case the computed value of $e$ is $$e + \frac{e(e - 10^{n-m+1})}{2x_m + 10^{n-m+1}} = \frac{N - x_m^2}{2x_m + 10^{n-m+1}}$$

The error in the final computed value is substantially a maximum when $e = 5 \times 10^{n-m}$ and $x_m = 10^n$ and is then:

$$\text{Maximum error} = \frac{(5 \times 10^{n-m})^2}{2 \times 10^n} = 1.25 \times 10^{n-2m+1}$$

minus terms of higher order. Thus, (as may be readily verified by numerical examples) this approximate computation is accurate to about $2m$ figures, the computed square root being always too small (unless $e$ is zero, in which case it is exactly right). The error is substantially the same in the complemental method.

Thus, if the changes in the subtrahend are stopped after the fourth overdraft, the maximum error is 1.25 in the eighth significant figure of the computed square root. This is adequate for the purposes for which the machine described herein was built, but if more accuracy is desired, the changes in the subtrahend can, of course, be continued for part or all of another column, e. g., by using $(2x_m + 5 \times 10^{n-m})$ as the subtrahend for the next five subtractions and $(2x_m + 15 \times 10^{n-m})$ thereafter.

*Modifications of desk calculator*

The necessary modifications of a standard key-set mechanical digital calculator and the switches mounted thereon or therein are shown schematically in Fig. 2. Other modifications, shown in the above-mentioned copending application, are useful when the square root computer is used as a unit of an automatic sequence computer as described therein, but are not essential to the present invention.

The motor 216 is disconnected from the motor switch 217, and the motor wires and the switch wires are all connected to points of the jack 201. A cam 219 is mounted on the main shaft 220 of the machine and operates a switch 118 to generate a pulse during each revolution. Optionally, as part of a guard circuit, a switch 221 is mounted over the carriage 223 and the latter is provided with an irregularity 222 which closes the switch when the carriage is in the proper position for starting the calculation of the square root computation. Also optionally, as part of the same guard circuit, several switches 124 are mounted on or under the keyboard and operated by the keys thereof and are all closed when all the columns of the keyboard are empty. This guard circuit makes the operation of the machine safer but is not essential to the invention. A set of switches 225, 226, 227, and 230 are provided which are controlled by the mechanism of the machine when in the subtracting, adding, and neutral positions and which aid in controlling the special operations taking place when an overdraft occurs. Of these, switches 225 and 226 are the back and front contacts of a double throw switch; and switches 227 and 230 likewise. Fig. 2 shows the lever 229 in its neutral position. As shown, it moves up during addition and down during subtraction, as indicated by the legends, "Add." and "Subt."

All the wires are, for convenience, led out to a multiple jack 201 into which the plug 301 fits. The plug 301 is shown partly in Fig. 3 and partly in Fig. 4. To summarize the connections to the fourteen jack points 202–215 are listed below.

| Jack Points | Parts and Accessories of Desk Calculator |
|---|---|
| 202, 203 | Motor 216. |
| 204, 205 | Motor switch 217. |
| 205, 206 | Main shaft cam switch 218, open when machine is at rest. |
| 207, 208 | Carriage guard switch 221, closed by spot 222 on carriage 223 when carriage is in proper position to start square root operation. |
| 209, 210 | Switch (or switches) 124, closed when keyboard (not shown) is empty. |
| 211, 213 | Switch 225, closed when machine is adding. |
| 212, 213 | Switch 226, closed when machine is neutral or subtracting. |
| 213, 214 | Switch 227, closed when machine is neutral or adding. |
| 214, 215 | Switch 230 closed when machine is subtracting. |

One important change is made in the automatic division control for providing an extra neutral cycle after each overdraft, as was noted briefly above, because the control relays do not receive the overdraft signal early enough to enter the correct number in the keyboard for the addition to occur during the first cycle after the overdraft. The standard machine adds during the first cycle after the overdraft, shifts the carriage during the second, and starts the next series of subtractions during the third. The machine as herein modified is neutral during the first cycle after the overdraft, adds during the second, shifts the carriage during the third and starts the next series of subtractions during the fourth. It may be noted that the machine is still capable of automatic division as before, but the process takes slightly longer.

The division control includes a single-toothed wheel 251 on the main drive shaft 220, an auxiliary shaft 244 provided with a crank or eccentric cam 242, a segmented gear wheel 253 and a second eccentric cam (not shown). The eccentric cam 242 operates the tie rod 241 which pushes and pulls the add-subtract control lever or bar 229. The segmented wheel 253 is provided with three groups of teeth at 120° intervals in the standard machine (not shown) and is provided with four groups of teeth at 90° intervals as shown in the modified machine. The add-subtract lever 229 is pivoted on pin 231 and is shown in the neutral position. When it is pushed in the clockwise direction through a small angle it moves parts of the mechanism (not shown) into position for subtracting, and when pushed through a similar angle in the opposite direction it moves the mechanism into position for adding.

When the machine is ready to start a division operation, the tie rod 241 stands in a raised position above and free of the pin 232, and the eccentric cam 242 stands in the dotted position 243. To start the division operation a control key or lever (not shown) is pushed. This pulls the control rod 240 downward pulling the open jaws of the tie rod 241 over the pin 232 which slides on the inner face of the outer jaw to pull the add-subtract lever 229 into the subtract position. The control rod is locked in this position by a latch (not shown)

until the division operation ends, and during the division operation the positioning of the add-subtract lever is controlled by the eccentric cam 242. The control key or lever closes the calculator motor switch 217 when released.

The wheel 251 with one tooth 252 is rigidly mounted on the main shaft 220 and rotates clockwise as shown. The tooth 252, however, extends through only half the thickness of the wheel 251, the other half, behind the tooth as shown, has a smooth circumference. A smaller wheel 253 having four pairs of teeth spaced around its circumference is splined to shaft 244 and normally rests against the smooth circumference of the larger wheel 251 while the machine is subtracting. This smaller wheel is provided with a hole 254 which fits over the rounded point of a pin 255 set in the frame (not shown). When an overdraft occurs, the wheel 253 is moved axially by mechanism in the standard machine to free it from the pin 255 and is momentarily held in the path of the tooth 252 of the larger wheel. This single tooth meshes with one of the pairs of teeth of the small wheel and turns the latter 90° during each of four revolutions of the main shaft until the small wheel has completed one revolution and drops back over the pin 255.

At the rest position 243 the eccentric cam 242 holds the lever 229 in the "subtract" position; when it has advanced 90° (as shown) from rest position and again at 270° it holds the lever in neutral; and at 180° from rest position it holds the lever in the "add" position. The other cam (not shown) actuates the carriage shift mechanism when in the 270° position. In this way the machine is controlled for performing the modified series of cycles following the overdraft as above described.

General features of electrical system

The standard desk type calculator usually has a 110 v. A. C. motor drive, and the power source 103 is so designated in Fig. 3. Any suitable voltage and type of current may be used, however.

The relay system is made up of standard telephone type D. C. relays. As shown it is operated from a power source 104, and a separate source 105 is provided to operate the solenoids which operate the keys of the calculating machine. One side of each source (shown as +) is grounded, and all switches are between this grounded side and the coils of the relays. This reduces the chances of short circuits when servicing the relays. The other side of each coil is connected directly or through a resistance to the "hot" side of the source. These "hot" wires are not shown in the diagram, but it is to be understood that all points labeled with a simple minus sign are connected to the minus post of the source 104, and those labeled with a minus sign inside a small circle are connected to the source 105.

For maximum dependability, the use of make-before-break contacts requiring critical adjustment is avoided. Likewise, circuits depending upon the differential timing of slow- or quick-operating relays or depending upon differential voltages are avoided.

For economy and ease of servicing, the actual flow of current through the solenoids or gangs of relays is broken at only a certain few switches, the majority of switches being opened or closed while little or no current is flowing through them. The circuit breaking switches preferably have heavy-duty contacts and are provided with spark suppressors (not shown) in known manner. These are principally in the starting and general control sections of the relay system.

Starting and general control circuit

Figure 3:
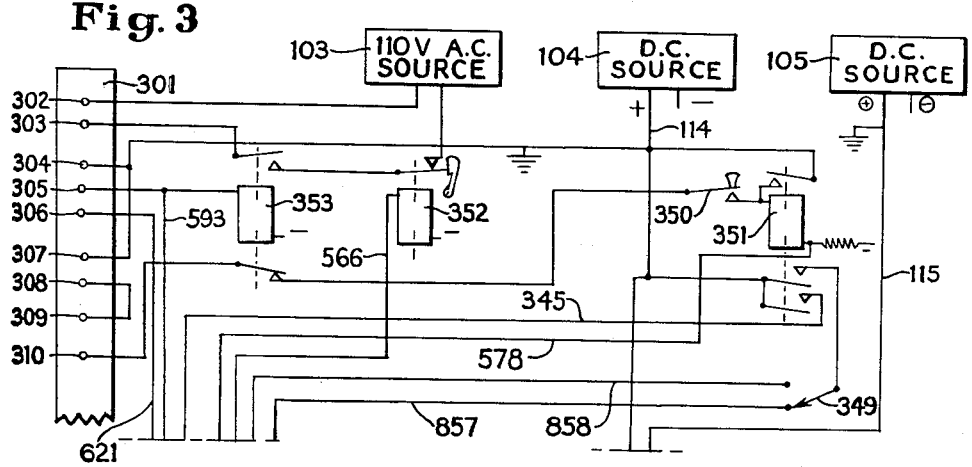
Fig. 3 shows the general control relays for the calculator.
Figure 4:
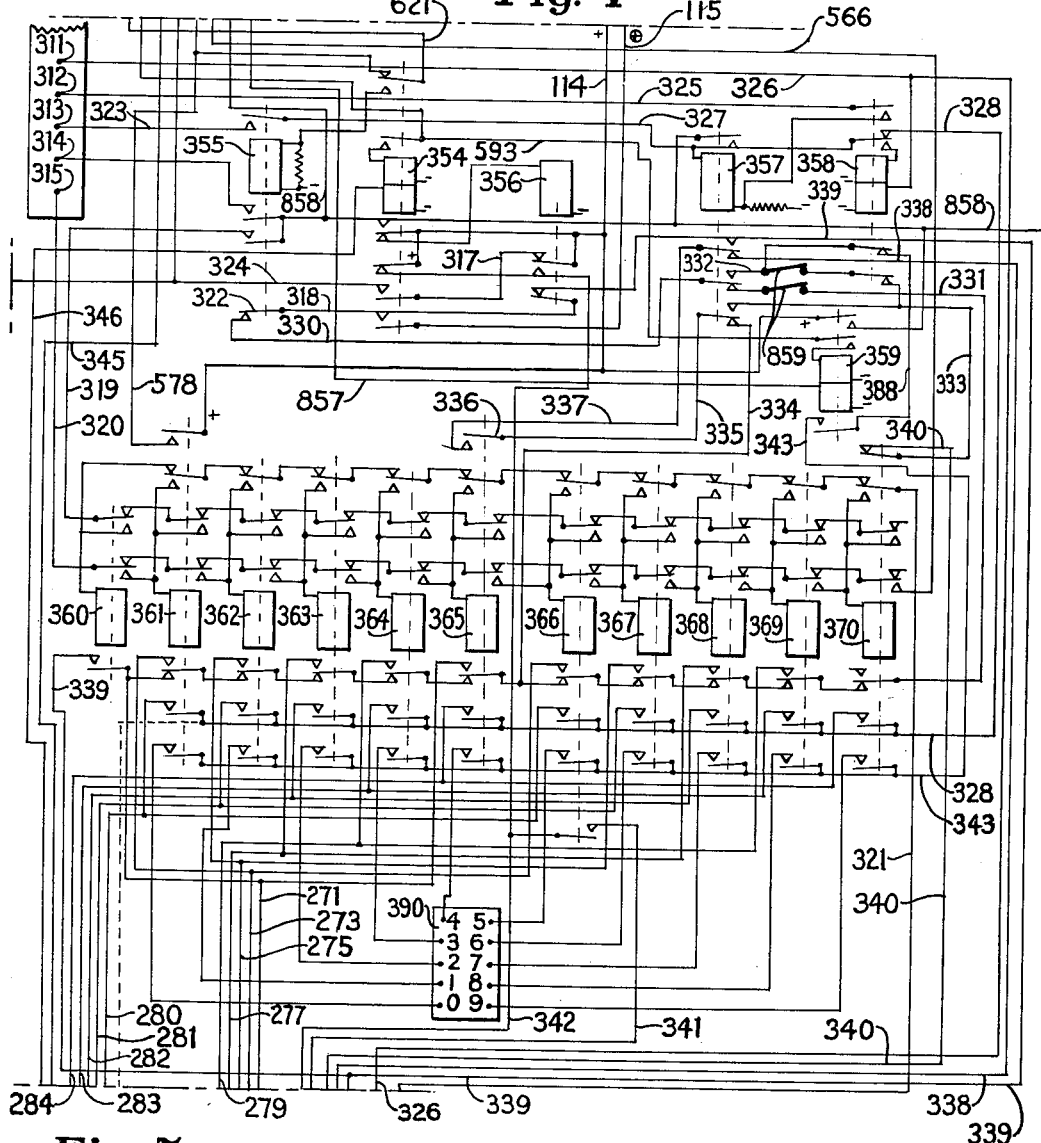
Fig. 4 shows the control relays for the square root routine and the counting chain or register.
Figure 10:
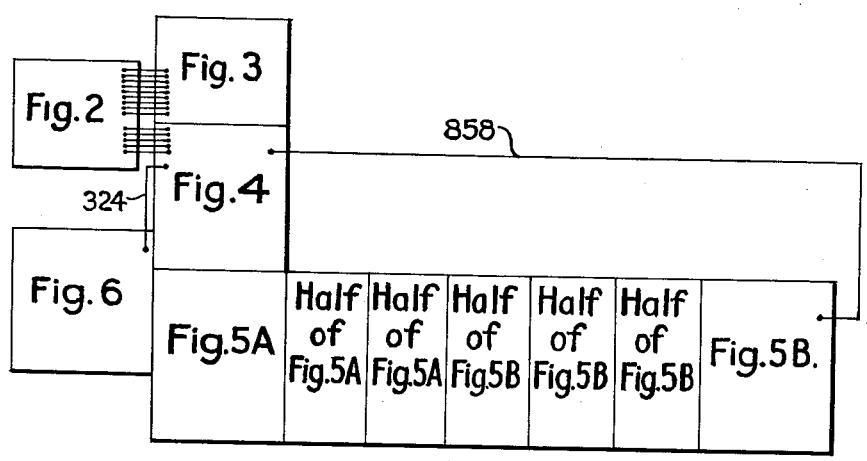
Fig. 10 is an assembly drawing showing how the detail figures are combined to give a circuit for computing ordinary square roots.
Figure 11:
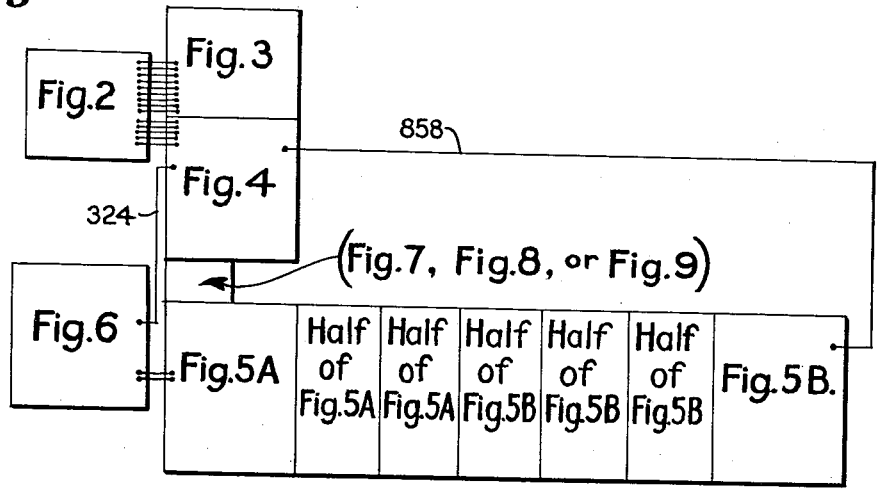
Fig. 11 is an assembly drawing showing how the detail figures are combined to give a circuit for computing complemental square roots or for selectively computing ordinary and complemental square roots.

Fig. 3 shows the part of the circuit which exercises general control over the operation of the calculator and which controls the starting of the square root computing circuit. The starting and general control circuit includes a motor control relay 353, an alarm relay 352, a starting switch 350, and a starting relay 351. These relays are connected to nine points 302–310 of the fourteen points of the plug 301 which fits into the jack 201 (Fig. 2) and are connected to the rest of the square root circuit by connections which are easily followed when the upper margin of Fig. 4 is matched against the lower margin of Fig. 3 as indicated in Figs. 10 and 11. The power supply 103, 104, 105 is also shown in Fig. 3.

The plug points 302 to 310 correspond respectively to the jack points 202 to 210 (Fig. 2) listed above.

The motor is connected through plug points 302 and 303 to an A. C. source 103. One side is connected directly and the other side indirectly through a normally open switch on the motor relay 353 and a normally closed switch on the alarm relay 352. The motor relay 353 is energized only when the motor switch 217 (Fig. 2) is closed connecting the + side of the D. C. source 104 through plug points 304 and 305 to the coil of the relay 353. This motor switch is closed mechanically by pressing any operating key on the standard calculator, the division key (not shown) being the only one directly involved in the present invention. The alarm relay 352 remains relaxed unless energized through an alarm circuit when something goes wrong, whereupon it is mechanically locked in the open position until released by hand. One alarm circuit 566 is described below in connection with the counting relays. An optional alarm circuit is described in detail in the copending application already mentioned and trips the alarm relay if the carriage fails to shift in about two seconds while the motor relay is energized.

The pulse generator switch 118 is also connected to the D. C. source 104 through the motor switch 217 when the latter is closed, and the pulses are brought out through plug point 306 and onto the pulse wire 621 to the relays shown in Fig. 4. Optionally, wire 621 is interrupted by a normally open switch (not shown) on the motor relay 353 to prevent undesirable feedback through sneak circuits under some conditions of use.

The manually operated starting switch 350 starts the square root operation if the machine is ready. The starting circuit begins at the + post of source 104, goes to plug point 307, over the carriage guard switch 221 (closed as shown in Fig. 2 only if the carriage is in the correct position) to plug point 308, then to plug point 309, over the keyboard switches 124 (closed as shown in Fig. 2 only if the keyboard is empty) to plug point 310, over normally closed switch on the motor relay 353 (to prevent the operation of the square root relay system when some previous operation is in progress) and over the manual starting switch 350 to the starting relay 351. The manual switch 350 needs to be depressed only long enough to close the relay 351, the latter being self-holding until it is released by a pulse over wire 578 when the square root operation is well under way, as will be explained later. Carriage guard switch 221, keyboard switches 124, and the normally closed switch on the motor relay 353 constitute a guard circuit which prevents the manual switch from having any further effect until the machine is again ready to start a square root operation, even though it were held down continuously. The guard circuit is optional, and is included for safety only. A somewhat different guard circuit is shown in the above-mentioned copending application.

When the starting relay 351 is energized, it applies locking voltage to the trunking relay chain described below (Fig. 5), either directly through wire 858 (Fig. 4) or indirectly through wire 857, relay 359 and wire 858 (Fig. 4), in accordance with the setting of the double-throw switch 349, and thus energizes the first pair of trunking relays 416, 417 (Fig. 5). Starting relay 351 also applies starting voltage to the square root control relay 354 (Fig. 4) via wires 345 and 346. Starting relay 351 is self-locking and applies the voltage to the two wires just described until it is released by a pulse sent back over wire 578 to the minus post of the relay coil after the square root operation has started. The connections between Fig. 3 and Fig. 4 in this form of the invention are listed as follows for convenience:

| | |
|---|---|
| 621 | Machine cycle pulses |
| 593 | Holding voltage |
| 345 | Starting voltage |
| 578 | "Has started" signal |
| 566 | Alarm signal |
| 858 | Locking voltage to trunking chain |
| 857 | Voltage to relay 359 |
| 114 | Plus voltage to relays |
| 115 | Plus voltage to solenoids |

Figure 13:
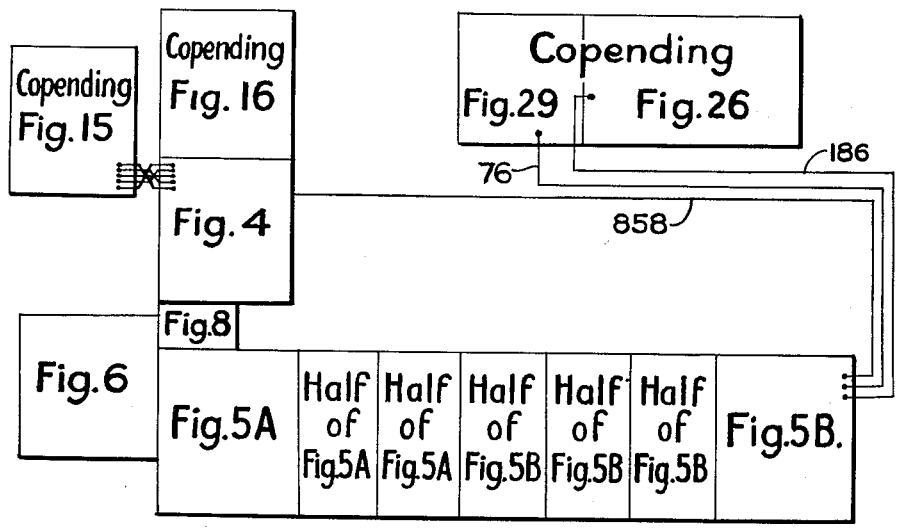
Fig. 13 is an assembly drawing showing how the detail figures and certain detail figures of the above-mentioned copending application are combined to give an arithmetical unit for an automatic sequence-controlled computer.

It will be apparent to circuit designers that the starting circuit, shown in Fig. 3, could be simplified. The circuit is designed, however, so that the rest of the circuit can be detached from this starting circuit and attached instead with little or no change to the circuit of the automatic sequence computer shown in the copending application above mentioned, and the square root computer will then operate as a unit of the larger machine. The diagram is arranged so that Fig. 4 can be placed against the lower edge of Fig. 16 of the copending application to show the principal interconnections, as indicated in Fig. 13.

*Square root control relays*

Fig. 4 shows the relays which control the square root operation specifically and the counting chain 108. These relays operate either with the general control relays shown in Fig. 3 when the invention is embodied as a separate unit or they operate as a part of a sequence computing machine such as described in the copending application, in which case the upper margin of Fig. 4 of this application is placed against the lower margin of Fig. 16 of the copending application as indicated in Fig. 13 to show the connections therebetween. There are only slight differences in the connections in the two cases. The wire 324 in Fig. 4 of the present case connects with wire 545A of Fig. 16 of the copending case to send the pulse to the operating key solenoid, whereas the operating key solenoid is shown in Fig. 6 of the present case. Also, the plus leads from the power supplies are not shown in full in the drawings of the copending case so that there are no wires shown connecting with wires 114 and 115 of Fig. 4 of the present case. It will be understood that such wires are present even though not shown.

Switches 859 (Fig. 4, upper right) are used only in a special form of the invention described below which is adapted to selectively compute square roots and perform ordinary division. For a better understanding of the invention it is to be assumed that these switches remain closed at all times when a square root is being computed.

Figs. 14, 15 and 16 are time charts intended to aid in a quicker understanding of Fig. 4 and may be referred to in connection with the following description.

Before describing the main series of relays 354 to 358, the optional auxiliary relay 359 will be described. Relay 359 is optional and is included when the conditions of use sometimes require the transmitting of the computed square root a digit at a time while it is being computed and sometimes require this transmission to be omitted. As explained above, one and only one of the wires 857 and 858 is energized when the square root operation is started and remains energized until after the operation has started. Wire 857 is energized when the square root is scheduled to be transmitted a digit at a time while it is being computed and wire 858 is energized when it is not so scheduled. When wire 857 is energized, it energizes relay 359 and this in turn, through its top switch, energizes wire 858. Wire 858 runs off the right side of the diagram Fig. 4, and as shown in Figs. 10 to 13, runs around to the right side of Fig. 5B to the trunking relays shown in more detail in Figs. 5A and 5B to apply locking voltage to the trunking chain and energize relays 416 and 417 thereof (Fig. 5A) as explained below. Relay 359 is self-holding through its upper winding on wire 583 which, as above explained, is energized throughout the computation of the square root. Relay 359, through its bottom switch, connects wire 388 to 343 so that the pulses over wire 388 (which are exactly the same as the pulses over wire 333 to be described below) can proceed over wire 343 to the lowermost row of switches on counting relays 361 to 370 to transmit the digits of the square root over the number circuits or group of wires which run to the multiple point plug 390. This plug fits into the jack 290 (Fig. 6) in one form of the invention and connects with number circuits "15" of the copending application in another.

At or about the same time that a voltage is applied over wire 857 or 858 (which immediately energizes relays 416 and 417 of Fig. 5A), a starting pulse is applied over wire 345 (either by the starting relay 351 or by a control relay of the controlled-sequence computer). This wire proceeds to the bottom of Fig. 4 and on to Fig. 5A which fits against the bottom of Fig. 4, and, as shown in Fig. 5A, it is connected with wire 346 when trunking relay 416 is energized. This starting pulse then returns via wire 346 to energizes the central control relay 354. This voltage is applied to relay 354 until after the square root operation is under way and self-holding voltage is applied to the upper coil of relay 354 via wire 593. This holding voltage continues as long as the calculator switch 217 (Fig. 2) is closed. Relays 354 and 359 are double-wound to prevent sneak circuits. The reason for running the starting circuit over a normally open switch on trunking relay 416 is to make sure that locking voltage has been removed from and reapplied to the trunking chain 109 when the invention is incorporated as a unit in a sequence-controlled computer.

The square root control relays include the central control relay 354, pulsing relay 355, a slow release relay 356 for controlling the length of the pulse to the operating key (that is, the division key) and overdraft relays 357 and 358 which make up a modified flip-flop pair for controlling the sending of the pulses to the keyboard solenoids and pulses to the storage relays and for controlling the resetting of the counting chain 360 to 370.

When relay 354 is energized, a number of changes take place. First, as already mentioned, the self-holding switch is closed. Second, the pulse wire 621 already described is disconnected from the back contact of a double throw switch through which the pulses are available for other purposes when not computing a square root and is connected via the front contact to the pulsing relay 355. Third, plus voltage wire 114 is disconnected from a back contact of a double throw switch through which it energizes slow-release relay 356 at all times except when a square root calculation is in progress and is connected instead through the front contact to wire 858 which, in addition to locking the trunking relays as already mentioned, applies voltage to two switches of the pulsing relay 355 and to the self-holding switch of the first overdraft relay 357. Fourth, the wire 114 carrying plus voltage is disconnected from wire 342 during the release time of slow release relay 356. Wire 342 supplies locking voltage to the storage relays shown in Figs. 5A and 5B, and by removing this voltage momentarily, the previously stored number is erased. Fifth, wire 317 which carries plus voltage while relay 356 is energized, is connected to wire 324 to apply voltage to the division key operating device 612 shown in Fig. 6, also shown as 412a in Fig. 16 of the copending case. Sixth, wire 115 carrying plus voltage from D. C. source 105 is connected to wire 318. Wire 318 is connected to wire 339 during the release time of slow release relay 356 and is also connected over a back contact of switch 322 of pulsing relay 355 to wire 330 which in turn is connected at this time to wire 331 via a back contact of a double throw switch on overdraft relay 357. Wires 331 and 339 are connected to keyboard solenoids as will be described later for entering the first trial divisor 01 (or 19) into the keyboard of the calculator.

The slow release relay 356 is shown in energized position, since it is energized as soon as the D. C. source 104 is originally turned on. As described above with reference to the central control relay 354, this relay applies voltage to the division key solenoid during its release time and thereafter it restores the locking voltage to the storage relays shown in Fig. 5. Also it connects wire 318 to wire 339 during its release time. It is the only relay shown in the energized position in the drawings. The release period of this relay is designated as the "preparatory interval" in the time chart Fig. 14.

The pulsing relay 355 is actuated by the pulsing switch 118 (Fig. 2) via wire 621, hence it operates and releases once during each revolution or cycle of the calculator. The timing of the pulsing relay 355 is adjusted by adjusting a resistance in parallel therewith to give the proper length of pulse, about 0.04 sec., so that in general the operations of the relay system occur during the first part of the cycle when the machine is actually subtracting, and the keyboard changes actuated by the off-beat pulse from switch 322 occur during the latter part of the cycle between one subtraction and the next. The pulsing relay 355 applies one continuous series of pulses to plug point 314 and a series in parallel therewith are sent over wire 319 as holding pulses for the counting chain and also as will be described later as holding pulses for the trunking chain. Plug points 311 to 315 fit into jack points 211 to 215, Fig. 2 or alternatively into the jack points to which wires "626," "625," "624," "622" and "623" respectively are connected as shown in Fig. 15 of the copending application. Switches 225, 226, 227, and 230 (Fig. 2) receive the pulses over plug point 314 and distribute them over plug points 311, 312, 313 and 315, as follows: when the calculator is adding, the pulse is sent back over plug points 311 and 313; when the calculator is neutral the pulse is sent back over plug points 312 and 313, and when the calculator is subtracting the pulses are sent back over plug point 315. It will be noted that pulses are sent back over plug point 313 when the calculator is either neutral or adding; that is, when it is not subtracting. Accordingly, the pulses returned over plug point 313 will be designated as non-subtract pulses and those returned over points 311, 312, and 315 as add pulses, neutral pulses and subtract pulses respectively in the explanation which follows.

The subtract pulses proceed via wire 320 to advance the counting chain 108 as will be described later while a series of subtractions is progressing. The non-subtract pulses, add pulses and neutral pulses proceed via wires 323, 326 and 325 to control the overdraft control relays 357 and 358, which will now be described. It is to be noted that wire 323 is connected with wire 327 during each pulse.

*Overdraft control relays.*—The overdraft control relays 357 and 358 stop the counting chain 108 when an overdraft occurs and send pulses to make the necessary changes in the keyboard according to one of the patterns described above and to store the number of subtractions counted by sending a pulse to the storage relays. When an overdraft occurs at the end of a series of subtractions, the next cycle is a neutral cycle sending pulses over wires 325 and 327. Wire 325 reaches a dead end at this time but wire 327 energizes relay 357. Relay 357 is self-holding and sends a long pulse to the storage relays (Fig. 5) via wire 328 and a normally open switch of one of the counting relays to store the digit just computed. The second cycle after an overdraft is an addition cycle. The second non-subtract pulse runs on to an already energized wire 327. The add pulse simultaneously therewith energizes the second relay 358 through its lower winding, thus interrupting the long pulse to the relay storage. This relay is self-holding from the temporarily energized wire 327. The third cycle after an overdraft is another neutral cycle. The third non-subtract pulse runs into an already energized wire 327. The second neutral pulse simultaneously therewith via wire 325 is applied to the other end of the coil of the first overdraft relay 357 releasing it. Then at the end of these simultaneous pulses, the holding voltage over wire 327 is withdrawn from the second relay 358, thus releasing it.

A further effect of the operation of these overdraft relays 357 and 358 is to route the off-beat pulses originating in switch 322 of the pulsing relay 355 through the rest of the relay system to the keyboard solenoids. These off-beat pulses reach the switches of the overdraft relays via wire 330. During a series of subtractions, the off-beat pulses proceed via wire 331 to be distributed by the counting relays 360 to 370. The first non-subtract pulse energizes relay 357 so that the neutral cycle off-beat pulse proceeds via wires 332, 333 and 388. The add pulse energizes relay 358 so that wire 332 is cut off from wires 333 and 388 during the add cycle off-beat pulse. The second neutral pulse releases relay 357 connecting wire 330 again with wire 331 so that the second neutral cycle off-beat pulse proceeds via wire 331. The trunking chain (Fig. 5) having advanced and the counting chain having reset in the meantime, this last-mentioned pulse travels through almost the whole chain of double throw switches shown below the coils of the counting relays 360 to 370 and proceeds via wire 271 to enter the first odd number into the next column of keys of the keyboard and, in the case of ordinary square root computations, proceeds via the bottom switch of relay 360 and wire 339 to change the last previously entered odd number to the next smaller even number. As will be explained shortly, all the relays of the counting chain except the first relay 360 are relaxed at this time and relay 360 is energized.

Special wires 334, 335, 337 and a switch 336 are provided to take care of the special cases in which the overdraft occurs at the fifth or a later subtraction. Fig. 15 may be referred to relative to the following part of the description. As will be explained shortly, the sixth counting chain relay 365 is energized at the beginning of the fifth subtraction cycle and remains energized at least until the beginning of the sixth subtraction cycle. The off-beat pulse during this cycle over wire 331 proceeds through the chain of double throw switches shown below the coils of the counting relays 360–370 to wire 334, thence to the lowest shown switch on overdraft relay 357, thence through wire 335 to switch 336 on the fifth counting relay 365, thence through wire 337 and the back contact of another double throw switch on overdraft relay 357 to wire 338 to change the number in the previous column of the keyboard from even to odd (or from odd to even). When this is followed by a sixth subtraction, relay 365 is relaxed at the beginning of the sixth subtraction cycle. On the other hand, when the overdraft occurs at the fifth subtraction, there is no further pulse over wire 320 to advance the counting chain and relay 365 remains energized throughout the first neutral cycle and the add cycle. During the first neutral cycle in the latter case, relay 357 is energized as previously explained. The off-beat pulse during this cycle proceeds over wire 330 to the front contact of a double throw switch on relay 357 via wire 332 over the back contact of a switch on relay 358, thence it forks on wire 333 one pulse going to the right and downward as previously explained to change the present column of the keyboard back to the previous odd number and the other pulse going to the left on wire 333 over the front contact of a switch on relay 357 over wire 335, switch 336 and wire 337 thence over the front contact of another switch on relay 357 to wire 339, whence it proceeds to undo the change just made by the pulse over wire 338. When the overdraft occurs at the ninth subtraction, counting relay 370 is energized and wire 333 is thereby disconnected from wire 340 so that the pulse which usually changes back to the previous odd number in the present column of the keyboard is ineffective.

*Counting relays or register chain*

The counting relays 108 (Fig. 1) are made up of the chain of relays 360 to 370 (Fig. 4). This chain constitutes a register for counting the number of subtractions (including the subtraction during which the overdraft occurs) performed in each carriage position. It is relaxed and reset during the add cycle to be ready for counting the subtractions in the next carriage position.

There are several different known counting chains which are suitable for use in the present circuit. The one shown is the same as that shown in Fig. 18 of the copending application. It consists of a starting relay 360 and a chain of ten counting relays 361 to 370, and the stepping of the chain is controlled by three double throw switches on each counting relay shown in the diagram above the relay coil. Locking voltage is first applied via wire 321 at the right-hand end of the upper row of switches. This voltage comes from the trunking relays, to be described later. The locking current flows through the back contacts of the upper row of switches to the pilot relay 360 and energizes it before the first subtraction begins. The pilot relay has only two double throw switches corresponding to the lower two double throw switches of each of the counting relays. The locking voltage thus applied holds any relay of the chain that is energized until a relay on the right of it is energized breaking the circuit through the upper chain of switches.

During the first part of every subtraction cycle, an "advancing" pulse from plug post 315 is applied via wire 320 to the left-hand end of the lowest of the three chains of double throw switches, and if any one relay is already in the energized position when this pulse begins, this pulse energizes the adjacent relay to the right. As already mentioned, this removes the locking voltage from the relay that was already energized so that an advancing pulse longer than a small fraction of a second would zip through the whole chain, energizing each relay in turn if it were not for the "holding" pulse coming directly from the pulsing relay 355 via wire 319 to the middle row of double throw switches. This holding pulse lasts as long as the advancing pulse and thus prevents the previously energized relay from relaxing until the advancing pulse ends. It is of general interest regarding this relay chain that if a long holding pulse is applied while several advancing pulses are applied, only the first advancing pulse is effective. Also, if several holding pulses are applied while no advancing pulse is applied as is done during the neutral, add and carriage shift cycles, this likewise has no effect on this chain. This last fact is made use of in the design of the trunking chain. Instead of applying a holding pulse directly to the trunking chain when it is advanced, the holding pulse over wire 319 goes through the counting chain, Fig. 4, through two switches of the relay which is energized at the time and out through wire 321 to the trunking chain to supply a holding pulse thereto during the addition cycle.

Thus this counting chain advances one step during the first part of each subtraction cycle including the subtraction cycle in which the overdraft occurs. Then during the latter part of each subtraction cycle, the off-beat pulse which, as above described, comes over wire 331, is led along the row of double throw switches shown immediately below the relay coils to one of the wires 271, 273, 275, 277 and 279, from whence it goes through one of the trunking relays (Figs. 5A and 5B) to one of the odd numbered solenoids of the present column of the keyboard so that successive off-beat pulses depress the odd numbered keys in succession until an overdraft has occurred, or alternatively, until the last relay 370 is energized during the tenth subtraction. It is easily seen that wire 331 reaches a dead end when this last relay 370 is energized, so that no further change is made in the present column of the keyboard during the tenth subtraction cycle. As above described, wire 328 is energized during the entire first neutral cycle after an overdraft. Wire 328 is connected with a normally open switch on each of the ten counting relays. One of these relays is energized at this time and connects wire 328 with one of the wires 280 to 284 to energize one of the number storage relays shown in Fig. 5.

Optionally, a second set of normally open switches is provided to which wire 343 is connected when it is desired to transmit the square root a digit at a time while it is being computed. In case relay 359 is energized as previously described, an off-beat pulse is sent from wire 388 via wire 343 to this lowest set of normally open switches, one of which is closed at this time so that one of the number circuits running to multiple point plug 390 is energized to transmit the digit just computed. When the square root is scheduled to be transmitted to the multiplier keyboard of the same calculator, this plug is fitted into the jack 290 shown in Fig. 6. When the invention is incorporated as a unit in a sequence-controlled computer and the schedule of computing calls for a transmission to a different number receiving unit, plug 390 is connected to the number trunks 15 shown in the copending application. The schedule of operations shown in the copending application does not, however, call for any transmission of this type except to the multiplier keyboard of the calculator on which the square root is being computed.

There are four special switches, one on each of four of the counting relays—namely, relays 361, 365, 366 and 370. The extra switch on the first regular counting relay 361 sends a pulse via wire 578 to signal the general control relays that the square root operation has started. When the invention is embodied as an independent unit, this pulse relaxes the starting relay 351 (Fig. 3). When the invention is embodied as a unit of a sequence controlled calculator, this pulse is optionally used to advance the sequence control. The special switch on relay 365 is a normally open switch which controls the "previous row odd" and "previous row even" pulses associated with the fifth subtraction cycle as above described. The special switch on relay 366 is a normally open switch shown below the relay coil which energizes the pilot relay (e. g. relay 415, Fig. 5A) of the storage relay groups via wire 341 when the count or subtractions goes above five. The pilot relays of the storage groups are shown at the bottom of Figs. 5A and 5B and are designated by numbers ending in 5. The storage relays store one of the digits 5 to 9 after this relay is energized rather than the digits 0 to 4. The extra switch on the tenth counting relay 370 disconnects wire 333 from wire 340 on the tenth subtraction cycle to render ineffective the off-beat pulse via wire 333 during the neutral cycle which usually changes the odd number in the present column in the keyboard back to its previous value, as already explained. Fig. 16 may be referred to relative to the switches on relays 366 and 370.

It may be noted at this point that an eleventh advancing pulse would indicate an error in the computation and would energize the alarm circuit 566. This would energize the alarm relay 352 (Fig. 3) and would prevent the further operation of the machine until manually reset.

Figure 7:
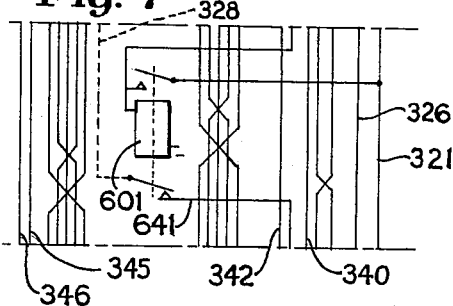
Fig. 7 (on same sheet as Fig. 4) shows a modification of the control circuit for computing complemental square roots.
Figure 8:
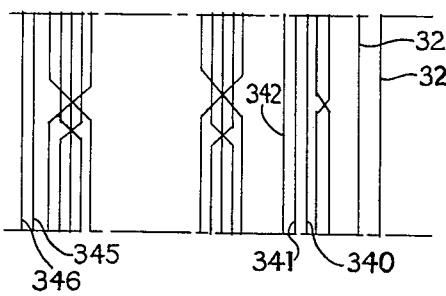
Fig. 8 is an alternative form of Fig. 7.
Figure 9:
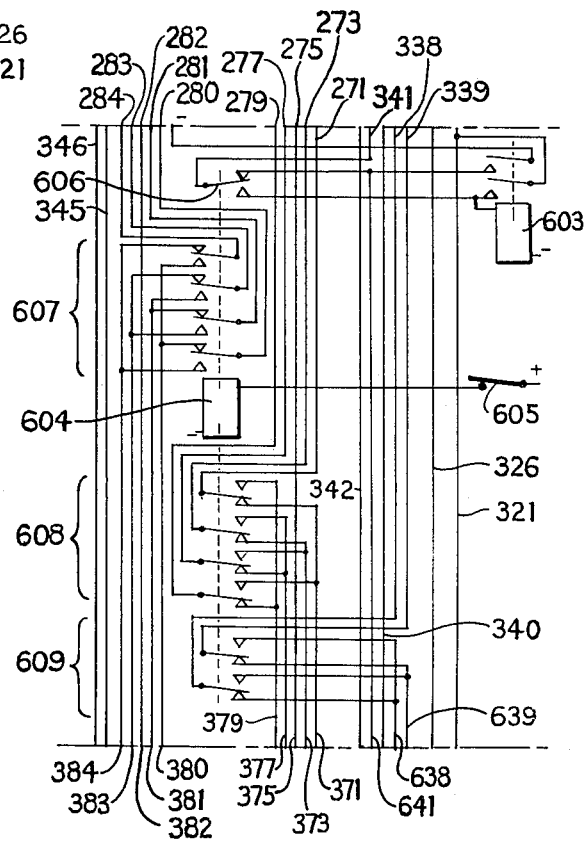
Fig. 9 shows a modification of the circuit for selectively computing ordinary and complemental square roots.

*Normal and complemental square roots.*—Before proceeding to the description of Fig. 5, it may be observed that when the upper margin of Fig. 5 is matched against the lower margin of Fig. 4 as indicated in Fig. 10, a circuit is shown which computes square roots in the ordinary way, and when Fig. 7 or 8 is matched against the lower margin of Fig. 4 and Fig. 5A is matched against the lower margin thereof as shown in Fig. 11, a circuit is shown which computes the square root of the complement of the number in the register, herein designated as a complemental square root. Also, when Fig. 9 is matched against the lower margin of Fig. 4 and Fig. 5A is matched against the lower margin of Fig. 9, as shown in Fig. 11, a circuit is shown which selectively computes normal square roots or complemental square roots. In the description of Fig. 4 above and in the description of Fig. 5 below, when a word or phrase is followed by a related word or phrase in parentheses, the first word or phrase applies to the ordinary square root computation and the word or phrase in parentheses applies to the complemental square root computation. For example, when the 3 (7) key of the keyboard is mentioned, the 3 key is intended when describing a circuit for computing ordinary square roots and the 7 key is intended when describing a circuit for computing complemental square roots. It may be noted that wires 280 to 284 in Fig. 4 are the same wires as wires 380 to 384 respectively in Fig. 5A when the circuit is made up to compute ordinary square roots, but they are given different numbers because they are not all the same wires when the circuit is made up for computing complemental square roots.

Trunking and storage relays

Figs. 5A and 5B show the storage and trunking relays. The trunking relays 109 (Fig. 1) are a stepping chain of novel form made up of two relays in each stage. The first stage 416 and 417, and the second stage 426 and 427 are shown in Fig. 5A. The last stage 486, 487 and the terminal relay 496 are shown in Fig. 5B. The number of intermediate stages in the chain depends upon the number of significant figures that are scheduled to be computed in the square root. In the assembly drawings, Figs. 10 to 13, eight stages are shown thereby the square root is computed to eight significant figures. The third and fourth stages of the trunking chain are exactly like the second stage shown in Fig. 5A between the line A—A and the right-hand margin. The fifth, sixth and seventh stages of the trunking chain are exactly like the eighth stage shown in Fig. 5B between the line B—B and the left-hand margin. The terminal relay 496 (Fig. 5B) is provided for preventing undesirable effects in case the mechanical calculator continues to shift the carriage after the square root computation is finished.

The storage relays 110 (Fig. 1) are made up of sets of six relays, each set being associated with one stage of the trunking chain. Storage relays 410 to 415 are associated with the first stage, storage relays 420 to 425 are associated with the second stage and storage relays 480 to 485 are associated with the last stage for storing the successive digits computed in the square root. When assembled to compute eight significant figures in the square root, a set of storage relays like relays 420 to 425 is associated with each of the third and fourth stages and a set of storage relays like relays 480 to 485 is associated with each of the fifth, sixth and seventh stages. The storage relay groups which are not shown are exactly like the groups which are shown except that the switches thereof which connect with wire 525 in the second stage connect instead with wire 535 in the third stage and wire 545 in the fourth stage and the switches which connect with wire 585 in the eighth stage connect instead with wire 555 in the fifth stage, wire 565 in the sixth stage and wire 575 in the seventh stage.

A group of ten number circuits are associated with each of the first four stages of the trunking and storage relays and are connected with the keyboard solenoids which are shown in Fig. 6. Rather than confuse the diagram by running these 40 lines to the left margin of Fig. 5A, we have shown only 20 wires and have shown them running to multiple point plugs 418 and 428, which fit into the corresponding jacks 218 and 228, in Fig. 6.

Figure 8A:
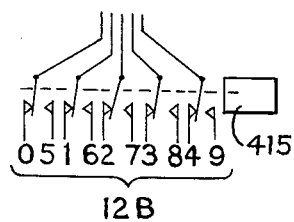
Fig. 8A shows the arrangement of the number circuits when the control circuit is modified according to Fig. 8.

Each group of six storage relays is arranged in a well known manner to store a digit of the square root according to a bi-quinary system of coding. One of the first five of these relays is energized, and this represents one of the digits 0, 1, 2, 3 or 4, when the sixth relay 415, 425 . . . 485 is relaxed and represents one of the digits 5, 6, 7, 8 or 9 when the sixth relay is energized. The storage relays are self-locking on wire 342 and the numbers stored therein may be transmitted therefrom at any time until wire 342 is de-energized. The preferred manner of transmitting the number is by energizing wires 515, 525, . . . 585, which in turn energize selected ones of the number circuits 12B, 12C, . . . 12I, in accordance with the relays which stand energized at the time. Optionally, wire 505 is provided for transmitting a zero in front of the first computed digit of the square root. In one form of the invention, the coding is slightly different and the switches of relays 415, 425, . . . 485, are connected to number circuits 12 as shown in Fig. 8A.

Each of the first four stages of storage relays are also adapted to store the last odd number subtracted in each column at the time it is operating as the "present" column and the next smaller even number for controlling the changes in the keyboard in the "present" column after the overdraft occurs and the changes in the same column when it becomes the "previous" column. These are stored in the sets of switches shown at the extreme left and at the extreme right respectively of each of the first two groups of storage relays and in the same way in the third and fourth groups.

Locking voltage is applied to the trunking relay chain at the right via wire 858 which runs from the right-hand margin of Fig. 4 around to the right-hand margin of Fig. 5B as shown in Figs. 10 to 13. As explained relative to Fig. 4, this wire is energized at the beginning of the preparatory interval and remains energized until the end of the square root computation. The locking voltage runs through the chain of double throw switches on relays 496, 486 . . . 426 and energizes relays 416 and 417. This closes the guard circuit 345, 346 so that the computation can start as previously explained. It also closes the single throw switch on relay 417 shown above the coil so that the locking voltage feeds back over wire 321 to apply locking voltage to the counting chain and to energize relay 360 as shown in Fig. 4. Relays 416 and 417 remain energized during the first series of subtractions for connecting wire 339 (338) to wire 500 via wire 639 and for connecting wire 338 (339) to wire 501 via wire 638 for sending the "previous row even" and "previous row odd" pulses to the left-hand column of the keyboard (Fig. 6). Relay 416 also connects wires 371, -3, -5, -7 and -9 to wires 711, -3, -5, -7 and -9 for sending the 1-, 3-, 5-, 7-, 9-pulses via multiple point plug 418 to the keyboard. Relay 417 connects wires 380, -1, -2, -3, and -4 to the storage relays 410, -1, -2, -3 and -4 respectively via wires 380B, 381B, 382B, 383B for storing the first digit of the square root as computed. It also connects wire 641 to relay 415 via wire 641B for energizing the sixth storage relay 415 under the control of relay 366 (and 601 or 603).

During the "add" cycle of the calculating machine, an advancing pulse is sent to the trunking chain via wire 326 under the control of switch 225 (Fig. 2). This advancing pulse proceeds via the front contact of the double throw switch on the relay 417 to the coil of relay 426 in the second stage of the trunking chain. Relay 426 operates and cuts off the locking voltage which up to this point has been applied to relays 416 and 417 via the back contact of the double throw switch on relay 426. This would permit relays 416 and 417 to relax and would allow the advancing pulse to zip through the whole trunking chain were it not for the holding pulse applied at the same time via wire 321. It will be recalled that locking voltage was sent from the trunking chain to the counting chain via wire 321 until the advance pulse starts and relay 426 is energized cutting off this locking voltage. However, at the same time that the advancing pulse is applied to the trunking chain via wire 326, a holding pulse is applied to the counting chain via wire 319 at this time, there is only one relay of the counting chain energized and the holding pulse proceeds through the center chain of double throw switches of the three chains of double throw switches shown above the coils of the counting chain relays, through the front contact of the central double throw switch of the one relay which is energized at the time (thus applying holding voltage to the coil of the same relay), thence through the front contact of the upper one of the same three double throw switches and then to the right through the remainder of the upper chain of double throw switches to wire 321, reversing the flow of current in wire 321 and supplying the holding pulse to the trunking chain. The holding pulse proceeds via the front contact of the single throw switch on relay 417 shown above the coil to hold relays 416 and 417 energized until the end of the advancing pulse. At the end of the advancing pulse and the holding pulse which end simultaneously at the middle of the add cycle, relay 426 stands energized and is held energized by the locking voltage via wire 858, but there is no longer any voltage applied to relays 416 and 417. Likewise, there is no voltage applied to the counting chain so that the one energized relay of the counting chain and relays 416 and 417 all relax at the same time. After relay 417 relaxes, the locking voltage which is applied to the coil of relay 426 proceeds to the double throw switch of relay 417, through the back contact thereof, then to the right again to energize relay 427. As soon as relay 427 is energized, the locking voltage applied thereto proceeds through the single throw switch shown above the coil thereof to wire 321 and back through wire 321 to the counting chain to apply locking voltage thereto and energize relay 360 (Fig. 4) as previously described. It may be noted that the relaxation time of the counting chain relays must be less than the time it takes one relay of the trunking chain to relax and another relay of the trunking chain to be energized and operate. This, however, is not a very stringent requirement.

The second stage relays 426 and 427 of the trunking chain remain energized during the second series of subtractions made by the calculating machine, and through the switches shown below the coils thereof, they connect wires 721, -3, -5, -7 and -9 to wires 371, -3, -5, -7 and -9 respectively in the same way that wires 711 to 719 were connected during the first series of subtractions. Also, they connect wires 510 and 511 to wires 339 and 338 in the same way that wires 500 and 501 were previously connected. The column of the keyboard of the calculating machine which was the "present" column during the first series of subtractions is now the "previous" column and the pulses over wires 510 and 511 proceed through switches of the one energized relay of the group of relays 410 to 414 to operate the last odd numbered key and the next smaller even numbered key of said previous column of the keyboard through a pair of wires running to the multiple point plug 418 which fits into the jack 218 of Fig. 6. Relay 427 connects the storage relays 420 to 425 in the same way that storage relays 410 to 415 were connected during the first series of subtractions.

The third and fourth stages of the trunking chain and the associated storage relays are the same as the second stage thereof except for the slight difference previously noted. Similarly, the fifth, sixth, seventh and eighth stages are like the eighth stage shown in the left half of Fig. 5B. In all the stages after the first, the operating circuit shown above the coils of the trunking relays is the same in each stage so that the trunking chain advances stage by stage at the end of each series of subtractions until finally the terminal relay 496 is energized at the end of the eighth series of subtractions. The terminal relay 496 does not apply locking voltage back through wire 321 to the counting chain (Fig. 4), hence relay 360 is not energized after the eighth series of subtractions and the counting chain is inoperative in case the calculating machine proceeds to make a ninth or a ninth and tenth series of subtractions. This detail is optional, of course, as the trunking chain can be made up in ten stages to compute a square root to ten significant figures, which is the full capacity of the usual calculator.

*The storage relays*

The storage relays have been almost completely described in conjunction with the description of the trunking chain. The storing of the digits of the square root as computed is of course optional and the choice depends upon the schedule in which the square root calculator is to be used. The square root can be read by looking at the quotient register of the calculating machine, or it can be transmitted a digit at a time over the number circuits which are shown in Fig. 4 leading to the multiple point plug 390 as above described. Usually it is preferable, however, to provide internal storage for storing the computed square root so that it may be transmitted electrically at any time until the next square root computation is started. For this purpose, a normally open single throw switch is provided on each relay of each group of five relays 410 to 414, 420 to 424, . . ., 480 to 484, and five double throw switches are provided on the sixth storage relay 415, 425, . . ., 485, the armature of each double throw switch being wired in series with one of the single throw switches as shown in Figs. 5A and 5B. The front and back contacts of the five double throw switches are connected to a digital group of ten number circuits 12B, 12C, . . ., 12I, corresponding to the number circuits "12" shown in the above-mentioned copending application.

Relay 860 (Fig. 5B) is provided for controlling the transmission of the number stored in the storage relays. Relay 860 is provided with eight or nine normally open single throw switches, the armatures of all of which are connected in common to wire 76 and the front contacts of which are connected to wires 505, 515, . . . 585. When the number is to be transmitted, relay 860 is energized by connecting wire 186 to the plus side of power source 104 and by connecting wire 76 to the plus side of power source 105 while relay 860 is so energized. The manner of connecting wires 76 and 186 with the power source is not shown in the present application, since it is not an essential part of the present invention. When the present invention is made up for manual control, these connections are made by a manually operated switch, and when the invention is made up as a unit of a sequence controlled computing machine, these connections are made by switches on control relays. One such sequence controlled computing machine is described in the above-mentioned copending application and wires 76 and 186 and relay 860 are identical with wires and relay bearing the same numbers in Fig. 34 of the copending application. Whatever the manner of energizing wires 186 and 76, when they are energized, wires 505, 515, . . . 585, are energized over the front contacts of the switches of relay 860 and they in turn energize all the armatures of the storage switches. Only one switch in each group of five switches is closed so that the armature of only one of the five double throw switches on the six relay of each storage group is energized. This sixth relay 415, . . . 485, stands either energized or relaxed so that either the front contact or the rear contact of this one energized double throw switch is energized whereby only one of the ten number circuits associated with each stage of the storage relays is energized for transmitting the number to any group of number-receiving solenoids with which the number circuits may be connected, as for example, an electric typewriter as described in the copending application. Optionally, wire 505 is connected directly to the zero number circuit 12A for transmitting a zero ahead of the computed numbers of the square root.

Trunking relay 416 connects wire 340 to wire 511 so that the "present row previous odd" pulse over wire 333 and wire 340 proceeds via wire 511 to the switch shown at the extreme left of one of the storage relays 410 to 414 and back over one of wires 711, -3, -5, -7 or -9 to a post of plug 418 which fits into jack 218 (Fig. 6) to change the number in the keyboard back to the number which was last subtracted when the overdraft has occurred during one of the first nine subtractions of a series.

*Keyboard solenoids*

Fig. 6 shows only the keyboard solenoids which are essential to the specific embodiment of the present invention described herein and a group of ten solenoids 51 which are optionally provided for pushing the keys of the multiplier keyboard. A group of forty-two solenoids 52 are provided for pushing keys of the main keyboard. The latter group of solenoids includes two for pushing the "zero" key and "one" key of a left-hand column of the keyboard and four groups of ten each for pushing the ten keys in each of the next four columns of the keyboard. Means 612 responsive to a pulse over wire 324 is provided for pushing the division key or operating the division lever of the calculator as the case may be. Other solenoids for the rest of the first column of keys and for other columns of keys in the keyboard are usually provided when the invention is embodied as a unit in a sequence-controlled computing machine and also operating solenoids for other operating keys. The means 612 can be a solenoid energized directly from wire 324 which runs from the left margin of the general control relay shown in Fig. 4 down to the right margin of Fig. 6 as shown in Figs. 1 and 11. However, it is preferably a solenoid energized through a monitor relay in the manner shown in Fig. 17 of the above-mentioned copending application. For this reason the circled + and — leads from power source 105 are shown in addition to wire 324 and the — lead from power source 104.

Wires 500 and 501 run from the trunking relays as shown in Fig. 5A, off the left margin of Fig. 5A to the right margin of Fig. 6, thence to the solenoids which operate the "zero" and "one" key of the left-hand column of keys in the main keyboard. Multiple point plugs 418, 428, 438 and 448 fits into multiple point jacks 218, 228, 238 and 248 respectively, thus connecting the first four stages of the trunking relays and the four groups of storage relays associated therewith, each respectively with one of the columns of keyboard solenoids. The keyboard solenoids and the jack and the plug points associated therewith are each numbered from zero to 9, designating the keyboard key which each solenoid operates. Likewise, the multiple point plug 390 (Fig. 4) fits into the jack 290 to connect the lower-most row of switches on the counting chain 108 with the multiplier keyboard solenoids 51 for transmitting the computed square root a digit at a time. This last-mentioned arrangement is optional and is not shown in the general diagram, Fig. 1. This connection of the counting relays to the multiplier keyboard corresponds to the arrangement shown in Figs. 4 and 18 of the copending application, and when the present invention is made up as a unit of the sequence-controlled computer therein described, the multiplier keyboard solenoids 51 are also connected across normally open switches of a trunking relay to the number circuits "15" as shown in Fig. 4 of the copending application.

The details of construction of the individual solenoids and the method of mounting thereof is shown in more detail in the above-mentioned copending application. It suffices to state here that the calculator itself is removably mounted in an operative position and that the solenoids are adapted to operate the keys of the calculator when the calculator is in the operative position.

*Complemental Square Root Circuit*

Fig. 7, Fig. 8 with Fig. 8A, and Fig. 9 show three modifications of the circuit for computing complemental square roots. When the accompanying drawings are assembled with the upper margin of Fig. 7 or of Fig. 8 matched against the lower margin of Fig. 4 and with the upper margin of Fig 5A matched against the lower margin of Fig. 7 or 8, as shown in Fig. 11, a circuit is shown which is adapted to compute complemental square roots. Fig. 8A shows the concomitant changes in the connections of the number circuit 12B when Fig. 8 is used as a unit in this assembly drawing. Corresponding changes are made in the other groups of number circuits. When Fig. 9 is similarly used as a unit in the assembly drawing, a circuit is shown which is adapted to selectively compute ordinary square roots and complemental square roots.

When Fig. 7 is assembled with Figs. 4 and 5A as just described, a circuit is shown for computing complemental square roots and storing the complement of the complemental square root for transmission over number circuits 12A, -B . . . -I. That is, if the complemental square root of zero is computed, that corresponds to the ordinary square root of 1.00, and the result computed by this circuit for transmission over the number circuits is 0.99 . . . with as many 9's as the capacity of the circuit provides, that is, eight 9's in the circuit herein specifically described. When this number is transmitted it is preferably recitified by a circuit shown in Fig. 30 of the copending application.

It will be observed that there are nineteen wires shown running off the lower margin of Fig. 4 and entering the top margin of Fig. 5A in the normal form of the invention. Of these nineteen eight run directly through Fig. 7 when Fig. 7 is inserted between Figs. 4 and 5A so that there is no change in the circuit as regards these eight wires. These eight wires are specifically wires 345 and 346 at the extreme left, the center wires of each of the two groups of five wires, and wires 342, 340, 326 and 321 to the right of these groups. The six single wires are numbered the same in Figs. 4 and 5A. Each of the two groups of five wires 280 to 284 and 271 to 279 in Fig. 4 connect with the corresponding groups 380 to 384 and 371 to 379 in Fig. 5A. In the ordinary form of the invention, they connect directly (that is, wire 280 with wire 380 and so forth), but in the modified form of the invention shown by inserting Fig. 7 between Figs. 4 and 5A, the right-hand group of five wires is reversed so that wire 271 connects with wire 379, 273 with wire 377, 277 with wire 373 and wire 279 with wire 371 for the purpose of routing the off-beat pulses so that they energize the keyboard solenoids in the order 9, 7, 5, 3, 1 instead of the normal order 1, 3, 5, 7, 9. It will be noted that in every case the center wire 275 and 375 is connected together, but the two parts of it are numbered consistently with the numbering of the others of the group. The left-hand group of five wires 280 to 284 of Fig. 4 connect directly to the corresponding group of wires 380 to 384 of Fig. 5A when the circuit is arranged for computing ordinary square roots for energizing one of the storage relays when the storage pulse is sent over wire 328, Fig. 4. When Fig. 7 is inserted between Figs. 4 and 5A for computing complemental square roots, this group of five wires is likewise reversed so that wire 280 connects with wire 384, 281 connects with 383, 282 connects with 382, 283 connects with 381 and 284 connects with 380 for the purpose of energizing relay 414 when the overdraft occurs during the first or sixth subtraction, and so on through the series to relay 410 which is energized when the overdraft occurs on the fifth or the tenth substraction. This is necessary so that when the present column becomes the previous column pulses, over wire 511 and 510, Fig. 5A, will be routed to the proper keyboard solenoid. This corresponds to the change made in the other group of five wires and similarly, although the center wire 282 and 382 is connected together in all forms of the invention, the two parts of it are numbered consistently with the numbering of the other wires in the group.

The circuit modification shown in Fig. 7 is arranged so that the number trunks 12B, 12C, etc. are connected to the storage relays in the same way as shown in Fig. 5.

27

For this purpose, relay 601 (Fig. 7) is provided for reversing the action of the sixth storage relay 415 and the corresponding storage relays of the other storage groups. In other words, whereas these pilot storage relays are energized in ordinary square root computations when the number of substractions runs to more than five and are not energized when the number of substractions is five or less, the reverse is true in the circuit which includes Fig. 7. This change is brought about by running wire 341, Fig. 4, to the coil of relay 601 so that relay 601 is energized during the sixth subtraction and is self-locking from wire 321 which supplies locking voltage to the counting chain until it is interrupted during the addition cycle of the calculator. When this form of the circuit is used, wire 328 is extended as shown by the dotted line to connect with a normally closed switch on relay 601 and the other side of the same switch is connected with wire 641, Fig. 5A. Wire 328 carries the storage pulse during the first neutral cycle after an overdraft and accordingly, when relay 601 is relaxed at this time, this storage pulse proceeds via wire 641 and 641B to energize relay 415 at the end of the first series of substractions and similarly, to relay 425 at the end of the second series of substractions, and so forth.

The next group of three wire 340, 338, and 339 carry the "present column previous odd" pulse, "previous column odd (even)" pulse and the "previous column even (odd)" pulse respectively. The first of these, wire 340, is connected directly to wire 340 of Figs. 5A and 5B as above mentioned. Wires 338 and 339 are reversed in the circuit including Fig. 7 however, and connect with wires 639 and 638 respectively, since the requirements for the previous row odd and even changes are reversed in the complemental method of computing square roots as compared with the ordinary method. As shown in Fig. 4, wire 339 derives its plus voltage from two different sources during the preparatory interval, one source being the normally open switch on slow-release relay 356 and the other the normally open switch on starting relay 360 of the counting chain. Although there is no harm in having both of these sources of voltage, the switch on relay 360 is optionally omitted when the invention is made up exclusively for computing complemental square roots because the "precious row odd" key is already depressed when the second neutral cycle after an overdraft begins and no pulse at this time is required. Such a pulse at this time does no harm, however, as it merely pushes on a key which is already depressed. In the form of the invention in which the ordinary type of square root computing is carried out, the switch on relay 360 is always included in the circuit. In that case, the normally open switch on relay 356 is optionally omitted since the switch on relay 360 provides plus voltage for this wire during the preparatory interval.

This accounts for all of the nineteen wires shown leaving the bottom of Fig. 4 and entering the top of Fig. 5A and also for the dotted wire 328 leaving the bottom of Fig. 4. It is not believed necessary to number all the wires in Fig. 7 as their correspondence to wires in Fig. 4 is directly evident.

Fig. 8 is very similar to Fig. 7, the chief difference being that relay 601 and the dotted portion of the wire 328 are omitted. Instead, wire 341 of Fig. 4 is connected directly to wire 641 of Fig. 5. The operation of the circuit shown in Fig. 8 is the same as that of Fig. 7 except that the pilot storage relays 415, 425, . . . 485, remain relaxed when an overdraft occurs during the first five subtractions of the series of subtractions corresponding to each storage relay group and is energized by the pulse over wire 341 when there are more than five subtractions in the series. Accordingly, the stored digits of the computed square root are coded on each group of storage relays by a different code than in the previously described arrangement. Fig. 8A shows the pattern of

28 the connections of the number circuits 12B to the front and back contact points of the double throw switches on relay 415. The connections to the other pilot storage relays is also the same as that shown in Fig. 8A. This form of the circuit for computing complemental square roots and with the normally open switch omitted from relay 360 (Fig. 4) is the preferred form of the circuit for use as a unit of the specific form of the controlled sequence computer described in the copending application since only complemental square roots are scheduled to be computed in the schedule of operations described therein.

Fig. 9 shows a modification of the circuit for selectively computing ordinary square roots and complemental square roots. Fig. 9 is to be inserted in the same way as are Figs. 7 and 8 between Figs. 4 and 5A. Relay 604 controls whether the computation is to be an ordinary square root or a complemental square root; when relay 604 is relaxed during the whole course of the computation, an ordinary square root is computed and when relay 604 is energized (by closing switch 605) during the whole course of the computation, a complemental square root is computed. Relay 603 operates in exactly the same way as relay 601 of Fig. 7 when a complemental square root is being computed, its coil being then connected via the front contact of switch 606 of relay 604 to wire 341. A group of four switches 607 controls the reversing of the connections of wires 280, 281, 283 and 284 with wires 380, 381, 383 and 384, and a similar group of switches 608 controls the reversing of the connections of wires 271, 273, 277 and 279 with wires 371, 373, 377 and 379 for the two types of computation. The two double throw switches 609 reverse the connections of the "previous row even" and "previous row odd" wires 338 and 339 with wires 638 and 639. Optionally, one more double throw switch (not shown) is provided on relay 604 for drawing the voltage of wire 339 from the switch on relay 360 when ordinary square roots are being computed and for drawing this voltage from the switch on relay 356 when complemental square roots are being computed. This last-mentioned double-throw switch on relay 604 is not essential to the invention, it is merely for eliminating a few unnecessary pulses to the keyboard solenoids.

*Assembly drawings*

Figs. 10 and 11 show the general plan of arranging the detail drawings to give the complete circuit for a square root computer according to the invention made up as a separate unit. In Fig. 10, Fig. 4 is matched to the bottom of Fig. 3 and Fig. 5A is matched to the bottom of Fig. 4. For a complete diagram, two additional copies of the right-hand half of Fig. 5A from the line A—A to the right-hand margin of the figure are made up and the first of these is fitted against the right-hand margin of Fig. 5A, while the second is matched against the right-hand margin of the first. Also, three extra copies are made of the left-hand half of Fig. 5B from the line B—B to the left-hand margin of the figure and these are matched side by side and the group matched against the right-hand margin of the second extra copy of half of Fig. 5A. Finally, Fig. 5B is matched against the right-hand margin of the last of these extra copies. This arrangement gives a complete diagram of all the wires in Figs. 3, 4 and 5 except for wire 858 which extends from the right-hand margin of Fig. 4 around to the right-hand margin of Fig. 5B, wires 186 and 76 (Fig. 5B) which are concurrently energized for transmitting the computed square root after the computation is finished and wires 505, 515, . . . 585, which connect to the different stages of the storage relays as previously described. Fig. 2 is to be placed at the left side of Figs. 3 and 4 and the points of the multiple point jack 210 are assumed to be connected to the points of the corresponding multiple point plug 301 (Figs. 3 and 4). This is indicated by lines in Figs. 10 and 11, but in practice the plug is inserted into the jack. Fig. 6 is matched to the left-hand side of Fig. 5A, there being only two wires 500, 501 which run directly across the matched margins. One wire 324 is assumed to run from the left-hand margin of Fig. 4 down to Fig. 6 to energize the division control key operating means. If preferred, Fig. 6 may be arranged as shown in Fig. 11. Further connections between Fig. 6 and Fig. 5A and also optional connections between Fig. 6 and Fig. 4 are understood to be made by multiple point jacks and plugs as previously explained.

Fig. 11 shows in a similar way the assembly of the detailed drawings when Fig. 7, Fig. 8 or Fig. 9 is included for computing complemental square roots. When Fig. 8 is included, Figs. 5A and 5B are modified as shown in Fig. 8A. This detail is not indicated in Fig. 11.

Figure 12:
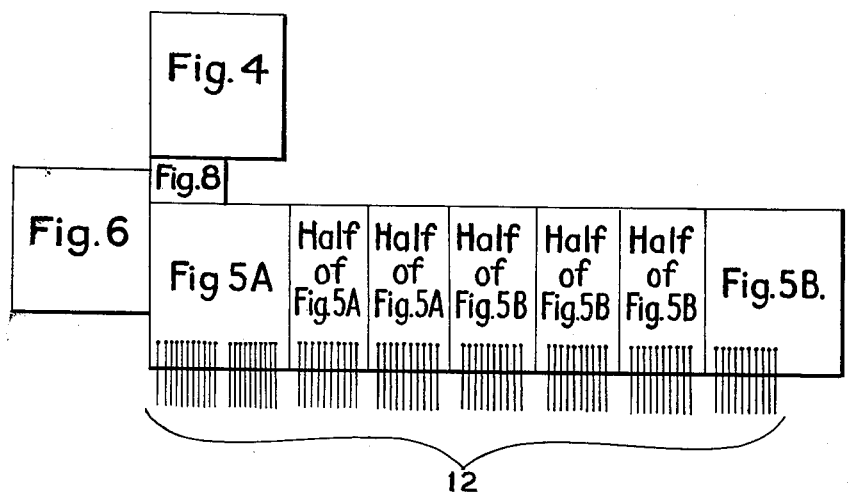
Fig. 12 is an assembly drawing showing how the detail figures are combined to give a circuit adapted to form a part of an arithmetical unit in an automatic sequence controlled computer.

Fig. 12 shows an assembly of detailed drawings forming a unit which is adapted to be combined with a sequence-controlled computing machine such as the one described in the copending application for serving as a unit of the larger machine and for computing the complemental square roots called for in the schedule of operations thereof.

Fig. 13 shows this unit combined with Figs. 15 and 16 of the copending application. It is to be understood that when the invention is embodied as a unit in a sequence computing machine computing ordinary square roots only, that the corresponding part of Fig. 10 is used instead of Fig. 12 and that when the invention is embodied as a unit in a sequence-controlled computing machine which schedules both the ordinary and the complemental square roots that Fig. 9 is used in place of Fig. 8 in the assembly drawing Fig. 12. The division control key operating means is shown in Fig. 6 of the present application and also in Fig. 16 of the copending application; it is to be understood however, that there are not two such control keys but only one, and accordingly, wire 324 should be considered as running to Fig. 16 of the copending application or to Fig. 6 of the present application but not to both of these figures. The connections between Figs. 15 and 16 of the copending application are not shown here but are shown in the copending application. Fig. 15 of the copending application connects with Fig. 4 of the present application in the same way that Fig. 2 of the present application does, except that the add-substract switches have been drawn inverted in one of the drawings as compared with the other. Accordingly, wires 623, 622, 624, 625 and 626 of the copending application are to be considered as connecting with plug points 315, 314, 313, 312 and 311 respectively of Fig. 4 of the present application. The wires which are common to Fig. 16 of the copending application and Fig. 4 of the present application have been given the same or generally similar reference numerals, and the circuit of Fig. 16 of the copending application operates in the same way as the circuit of Fig. 3 of the present application insofar as it relates to the circuit of Fig. 4 thereof. Wire 858 originates in the sequence control corresponding to the control 26 shown schematically in Fig. 16 of the copending application and proceeds through Fig. 4 and around to the right-hand margin of Fig. 5B as indicated. Wires 76 and 186, Fig. 5B, are energized under the control of the number transfer control and the fifth sequence control shown in Figs. 29 and 26 respectively of the copending application, as indicated in Fig. 13 of the present application.

*Timing charts*

Figs. 14, 15 and 16 are charts showing the timing of the pulses over the various wires and the periods during which the relays of Fig. 4 are energized. They are included to aid in an understanding of Fig. 4, and are intended to be studied in conjunction therewith. Fig. 14 is a chart showing the timing of these pulses when an overdraft occurs during the fourth subtraction of the first series of subtractions of the square root calculation. As above mentioned, the relays and the wires are numbered in the first column and the time scale extends from left to right. The second column corresponds to the preparatory interval above mentioned—that is, the release time of the slow release relay 356, and thereafter each column corresponds to one cycle or one revolution of the drive shaft of the calculating machine. Relay 356 and wire 342 are energized before the beginning of the preparatory interval, in fact, as soon as power is first turned on, and this fact is indicated by the short length of heavy line to the left of the preparatory interval column. The periods during which each wire and relay is energized are indicated by broad lines and the periods during which they are not energized are indicated by fine lines. In some cases, the fact that the wire or relay is sometimes energized from one source and sometimes from another source are indicated by broadening the line upward to indicate the one source and broadening it downward to indicate the other. For example, wire 319 is first energized from the trunking chain via wire 321 and via the upper row of switches on the counting chain, then during each holding pulse from the pulsing relay 355 it is energized from both ends until one of the relays of the counting chain has time to operate, then only from the pulsing relay 355 during the remainder of the hold pulse, then again from the trunking chain as soon as the previously energized counting relay has time to relax. It is this sneak voltage back through the counting chain that makes necessary two pulsing switches on relay 355 for the advancing pulse and the holding pulse respectively. The timing of the various pulses has been described relative to Fig. 4 and the description will not be repeated here.

Fig. 15 shows the timing of the energizing of the various wires during the overdraft cycle, the neutral cycle, the addition cycle and the second neutral cycle (or shift cycle) when the overdraft occurs during the fifth subtraction. The top five lines of Fig. 14 are omitted from Fig. 15 since the same pattern continues or repeats during these further cycles and additional wires are indicated at the bottom of the chart which are omitted from Fig. 14 because they are not energized when the overdraft occurs before the fifth subtraction. It will be noted that wires 337 and 338 are energized during the overdraft cycle and wires 337 and 339 during the first neutral cycle as previously described. This pulse comes from wire 334 in the first case and wire 333 in the second. In other respects, the timing of the pulses is substantially the same as that shown in Fig. 14 except that a different counting relay is energized during the neutral cycle and accordingly, the off-beat pulse and the storage pulse each proceed via a different wire to Fig. 5A.

Fig. 16 shows the timing of the pulses during the sixth subtraction cycle which differs from the others in that wire 341 is energized at this time to control the energizing of the pilot storage relay 415. Fig. 16 also shows the energizing of the wires during the tenth subtraction cycle. It is understood that normally the overdraft always occurs during the tenth subtraction if it has not occurred sooner. During this tenth subtraction cycle, no off-beat pulse proceeds over wires 271 to 279 to make a keyboard change and accordingly, no correcting pulse proceeds via wire 340 during the neutral cycle. The two cycles following the first neutral cycle are so closely similar to those shown in Fig. 14 that it is not believed necessary to repeat them in detail.

*Special modified circuit for ordinary division*

The pair of switches 859 shown near the upper right-hand corner of Fig. 4 are for the purpose of adapting the circuit shown herein to operate as a quotient register during the division of one number by another in the same way as the circuit shown in Fig. 18 of the copending application except for the added function of storing the resulting quotient for later transmittal. To adapt the circuit for divisional control the guard circuit is not routed through the series of switches 124 (Fig. 2) for ascertaining that the keyboard is empty but optionally may pass through a similar set of switches as shown in the copending application for making sure that the keyboard is full, and the off-beat pulses which normally proceed to the keyboard are suppressed by opening switches 859 and thus making a break in wire 331 and in one branch of wire 332. It may be noted that switches 859 do not affect the operation of relay 359. When relay 359 is energized during a division operation, the quotient is transmitted a digit at a time in the same way that a square root (or its complement) is transmitted during the computation thereof as above described. Likewise, switches 859 do not affect the storage pulses which proceed via wires 328 and 341 to energize the appropriate storage relays for storing the quotient for later transmittal. These switches cut off all the other off-beat pulses, however, which would otherwise proceed over wires 331 and 332 for making the keyboard entries during a square root computation.

When the circuit according to the invention is embodied as a separate machine, switches 859 and switch 605 (Fig. 9) are manually operable. When, on the other hand, it is embodied as a part of an arithmetical unit in a controlled sequence computer, switches 859 are preferably switches on a relay (not shown) and switch 605 is a switch on another relay (not shown) both of which are operable by the sequence control.

The invention is described above in a form according to which a minimum of modifications are made in a standard calculator. It is to be understood, however, that the invention is not limited to that form. Particularly, the solenoids for depressing keys are only one form of number entry means, and other means of operating the number selectors (the parts of a calculator directly underneath and ordinarily operated by the keyboard and other parts cooperating therewith for setting up a subtrahend) are to be considered within the scope of the invention. Also, other known counting means such as a ratchet switch or a stepping switch can easily be substituted for the counting chain 108. By an obvious modification of the calculator mechanism, such a stepping switch is mechanically actuated by the calculator while the latter is subtracting.

On the other hand, the control circuit shown in Figs. 3, 4 and 5 forms a square root computer when connected with any type calculator (such as an all-relay calculator) which is started by a pulse via a wire connected to wire 324 in the same way as the calculator shown herein, which transmits steady voltage over a wire connected to wire 593 and pulses over wires connected to plug points 311 to 315 (Fig. 4) during additions, neutral cycles, and subtractions as described herein while executing the process of successive subtractions interspersed with single additions as described herein, and which has number entry means electrically operated over number circuits connected to wires 500, 501, and to the points of plugs 418, 428, etc. (Fig. 5).

Figure 17:
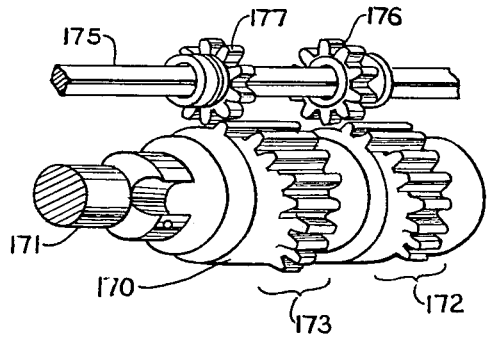
Fig. 17 is a detail of a preferred number entry means.

Fig. 17 (on the sheet with Fig. 8) shows a detail of the number entry means of a mechanical calculator according to one form of the invention. The stepped tooth gear 170 is a well known device in the calculating machine art. Around one circumference there is one gear tooth and the rest of the circumference is smooth (or cut away). Around other circumferences there are two to nine teeth respectively, hence the name "stepped tooth gear." The stepped tooth gear rotates with its shaft 171 which is positively driven to rotate once during each cycle of the machine.

One digit of the number to be subtracted or added is selected by moving a pinion on a parallel shaft 175 relatively to the stepped tooth gear so that it meshes with the selected one of the ten circumferences (including a circumference with no teeth), and other digits by substantial duplications of the same mechanism. In some machines a single pinion is pulled through all ten positions by a lever arrangement (not shown). More commonly, however, and more conveniently, there are two pinions 176, 177 which slide on the non-circular shaft 175, one of which (in known machines) is slide past the 1-, 2-, 3-, 4-, and 5-toothed circumferences and the other of which is slid past the 6-, 7-, 8-, and 9-toothed circumferences by known lever arrangements (not shown) usually operated by the keys of the keyboard. For cooperation with the two pinions, the stepped teeth are divided into two groups with a smooth circumference between. The shaft 175 is geared to a wheel of the register in known manner during a subtraction cycle or an addition cycle.

In another known machine, the stepped tooth gear is divided into two parts slideably mounted on a non-circular shaft and the two parts are selectively slid into mesh with a single pinion. One part has 1-, 2-, 3-, and 4-toothed circumferences and the other has a 5-toothed circumference additive thereto, i. e. cut in a different azimuth. Both parts are enmeshed with the pinion when selecting one of the digits 6, 7, 8 or 9.

The carry-over or transfer mechanism is not shown, since it is of known construction.

According to this feature of the invention, one group of teeth 172 of the stepped tooth gear has 2-, 4-, 6-, and 8-toothed circumferences, and the other group 173 includes a one-toothed circumference. In the form shown, the second group 173 also has 3-, 5-, 7-, and 9-toothed circumferences, and in an optional form it has only the single-toothed circumference which is additive to the even-numbered circumferences of the first group for selecting the odd-numbered digits.

It will be seen that this feature greatly reduces the distances through which the pinions are moved between successive subtractions of the square root computation as compared with the usual arrangement of the stepped tooth gear. This has several advantages when combined with the solenoid number entry means or with other forms of number entry means in reducing the movement of the parts which are repeatedly being moved during the square root computation and thus reducing the wear thereof and increasing the reliability of operation. Furthermore, it has special advantages when combined with number entry means which operate directly on the number selector levers in that it greatly simplifies the operation thereof. This is because only one of the pinions is moved through successive positions to select the odd digits 1, 3, 5, 7, and 9, whereas both have to be moved to select this sequence of digits when known stepped tooth gears are used.

Summary of modifications

To clarify the description of the various modifications of the invention, the following brief summary thereof is appended.

1. The electrical square root control circuit, Figs. 4, 5, and 6, can be used (a) with a mechanical digital calculator provided with electrically operated number entry means or (b) with an electrical digital calculator (relay or electronic) having corresponding starting, pulsing, and number entry circuits.

2. The square root circuit, Figs. 4, 5, and 6 is combined (a) with the starting circuit Fig. 3 as indicated in Fig. 10 for use as an independent unit, (b) with the circuit of a controlled sequence computer such as shown in the copending application as indicated in Fig. 13, or (c) if desired with both for selective operation in both manners.

3. When using forms 1a and 2a, just mentioned, the trunking chain and storage relays may be (a) as indicated in Figs. 10 to 13 for electrically transmitting the computed square root or (b) the square root may be read by looking at the counting means commonly known as the quotient register on the calculator. In the latter case, the trunking chain may be simplified to consist of five stages, an initial stage shown in the left hand half of Fig. 5A, three intermediate stages as shown in the right hand half of Fig. 5A, and a final stage shown in the right hand half of Fig. 5B, and the storage relays may be simplified by omitting the pilot relays 415, 425, ... and the switches which are shown connected to wires 515, 525. ...

4. The circuit may be made up (a) for computing a square root directly as indicated in Fig. 10, (b) for computing the complement of the square root of the complement of a number by adding Fig. 7 to the diagram as indicated in Fig. 11, (c) for computing the square root of the complement of a number by adding Fig. 8 instead of Fig. 7 and modifying Fig. 5 according to Fig. 8A, and (d) for selectively computing a square root directly or the complement of the square root of the complement of a number by adding Fig. 9 instead of Fig. 7.

5. The transmittal of the square root during the computation thereof may be (a) omitted by omitting wire 857, relay 359, wire 343, the switches of relays 360—370 connected to the latter and the wires connecting these switches with plug 390, (b) may be always provided by omitting wire 857 and relay 359 and connecting wire 388 directly to wire 343, (c) may be selective as shown.

6. The optional computing of quotients may be (a) omitted by omitting switches 859, Fig. 4, and substituting permanent connections or (b) may be provided as shown. Obviously, if only quotients were computed and not square roots the circuit would not be according to the present invention. Incidentally, skillful circuit designers will see at once that relay 358 has two switches shown below the coil where only one is necessary, but two have been drawn to simplify the diagram.

7. The counting means may be (a) the chain of relays 360—370 Fig. 4, (b) may be replaced by an electrically operated stepping switch in known manner, or (c) by further modifying the calculator may be replaced by a mechanically operated stepping switch.

8. The number selector may be (a) standard or (b) as shown in Fig. 17. When combined with solenoid number entry means as shown in Fig. 6, no further mechanical change of the standard calculator is necessary, but the solenoids are in that case numbered 0, 1, 3, 5, 7, 9, 2, 4, 6, and 8 from bottom to top of each column, or the known lever arrangement beneath the keyboard may be modified in obvious manner to retain the normal numbering from zero to nine.

9. The electrical number entry means may (a) operate the keys as indicated in Fig. 6 or (b) by simple changes in the calculator mechanism may operate the number selector levers under the keyboard when the feature shown in Fig. 17 is included.

10. Purely mechanical operation of the number selector is also contemplated when the feature shown in Fig. 17 is included.

Considering only items 1, 2, 4, 5, 6, 7, and 8, which offer mutually independent choices, it may be seen that 1296 different arrangements, all useful in different applications, have been described, and items 3, 9 and 10 provide a few more. Modifications of circuit details in known manner which will readily occur to those skilled in circuit design we consider to be within the scope of our invention.

It will be noted that the computed square root is stored in different forms in different modifications of the invention. When stored in the quotient register, the calculator is preset by setting a lever provided on the standard machine to count the subtractions additively or subtractively. Thus if there are 2, 5, 7, 0, ... 0 subtractions in the successive series, the number stored in the quotient register is 0025700000 or 9974300000 according to the setting of this lever (assuming that the register is preset to start the computation in the eight position counting from the right). In an ordinary square root computation, the square root is then 257, and in a complemental square root computation it is 743. When stored in storage relays, the number stored is 025700000 or 074299999 in different arrangements of the storage relays as described, and the interpretation is the same except for the well-known "fugitive one." In every form of the invention a representation is stored which is available after the computation is completed and which has a definite meaning in the light of preselected features and of preset selectors of the invention and of the calculator.

Also, as described in treatises on logarithms and elsewhere, the decimal point may be arbitrarily moved an even number of places in a number whose square root is to be computed and the decimal point of the computed square root moved half as many places in the opposite direction. Also negative numbers are conventionally multiplied by −1 before computing the square root. It is convenient at times to consider all numbers as being reduced in this manner to positive numbers less than unity for the purpose of computing the square root. Thus a computer which is capable of computing square roots of numbers smaller than unity is in fact a universal square root computer.

We claim:

1. A square root computer comprising in combination (1) a starting switch, (2) an electrically driven mechanical digital calculator having a presettable register, number entry means, a control key and control means responsive to said control key for causing the calculator to perform a first series of subtractions of a subtrahend in the number entry means from a minuend preset in the register ending when an overdraft occurs, to perform a single addition after the overdraft, to shift the relative decimal position of the register and the number entry means after the addition and to perform a second series of subtractions ending when a second overdraft occurs, said number entry means comprising in each decimal order mutually meshable stepped-tooth gear means and pinion means, one of said two mutually meshable means being divided into two parts independently slidable on a non-circular shaft for selectively meshing the pinion means with different circumferences of the stepped-tooth gear means and thereby selectively rendering zero to nine teeth effective, (3) counting means for counting the subtractions in each series, (4) electrical number circuits operatively connected to said number entry means for sliding said slidable means (5) switching means initially under the control of said starting means and afterward under the control of said counting means for selectively energizing said number circuits according to a predetermined sequential pattern for rendering successive odd numbers of teeth of said stepped-tooth means effective in rotational sequence in one decimal order during successive subtractions of said first series of subtractions and in the next lower decimal order during the second series of subtractions.

2. A square root computer according to claim 1 in which said control means includes means for causing the calculator to execute a neutral cycle after the overdraft and before the addition, wherein a "neutral cycle" is an operation of the calculator during which the register is disengaged from the number entry means, and in which said switching means includes means for selectively energizing the number circuits during the neutral cycle for restoring the number subtracted during the overdraft cycle.

3. A square root computer according to claim 1 having presettable selecting means for selectively rendering said number circuits inoperative whereby the computer selectively computes the square root of a number or the quotient of two numbers preset in the register and the number entry means respectively.

4. A square root computer according to claim 1 in which said switching means energizes the number circuits according to the successive odd numbers in ascending order beginning with 1, whereby the count of the subtractions previous to the subtraction during which the overdraft occurs in each series gives a digit of the square root of the number preset in the register.

5. A square root computer according to claim 1 in which said switching means energizes the number circuits according to the successive odd numbers in descending order, whereby the count of the subtractions previous to the subtraction during which the overdraft occurs in each series gives a digit of the complement of the square root of the complement of the number preset in the register.

6. A square root computer according to claim 1 having presettable selecting means for causing the number circuits to be successively energized in accordance with odd numbers in ascending order when preset in one position and for causing the number circuits to be successively energized in accordance with odd numbers in descending order when preset in another position whereby the computer selectively computes the square root of the number preset in the register or the complement of the square root of the complement of the number preset in the register.

7. A square root computer comprising in combination starting means, a mechanical digital calculator having a presettable plural-denomination register, plural-denomination number entry means including selectively engagable stepped-tooth gear and pinion means in each decimal order thereof, and control means responsive to the starting means for causing the calculator to perform a series of subtractions of a subtrahend in the number entry means from a minuend preset in the register ending when an overdraft occurs, to execute a neutral cycle after an overdraft occurs and to perform an addition after the neutral cycle for correcting the overdraft, wherein a "neutral cycle" is an operation of the calculator during which the register is disengaged from the number entry means, counting means for counting the subtractions in said series, electrical number circuits operatively connected to said number entry means for selectively engaging the stepped-tooth gear and pinion means for setting up numbers therein, and switching means initially under the control of said starting means and afterward under the control of said counting means for selectively energizing said number circuits according to a predetermined sequential pattern for setting up in two adjacent denominations of the number entry means successive odd numbers in the range between 1 and 19 inclusive and beginning at one end of said range before successive subtractions of said series, said switching means including means for selectively energizing the number circuits during the neutral cycle for restoring the number subtracted during the overdraft cycle.

8. A square root computer according to claim 7 having means controlled by said counting means for temporarily disconnecting said number circuits after the ninth subtraction and second means controlled by said counting means for stopping the operation of the computer when an overdraft fails to occur before the end of the tenth subtration of the series.

9. A square root computer comprising in combination (1) a starting switch, (2) an electrically driven full-keyboard mechanical calculator of a type having a presettable register, a control key, and control means responsive to said control key for causing the calculator to perform a first series of subtractions of a subtrahend in the keyboard from a minuend preset in the register ending when an overdraft occurs, to perform a single addition after the overdraft, to shift the relative decimal position of the register and the keyboard after the addition, and to perform a second series of subtractions ending when an overdraft occurs, (3) electromagnetic solenoids adapted to operate the "zero" key and the "one" key of one keyboard column and all the keys of at least the first and second column to the right thereof, (4) counting means for counting the subtractions in a series of subtractions, (5) means responsive to said starting switch for operating said control key, (6) means responsive to said control means for zeroizing said counting means after said addition for counting said second series of subtractions, (7) electrical number circuits individually connected to said solenoids, and (8) switching means initially under the control of said starting switch and afterward under the joint control of said counting means and said control means for selectively energizing said number circuits according to a predetermined sequential pattern for entering successive odd numbers in the range between 1 and 19 inclusive into said one keyboard column and said first column to the right before successive subtractions of said first series, for ensuring that the last subtracted number S is in the number entry means during the addition, and for entering successive odd numbers in the range between (10S−9) and (10S+9) inclusive into said three keyboard columns before successive subtractions of said second series, each series of odd numbers beginning at one end of said respective range.

10. A square root computer according to claim 9 in which said switching means are arranged for entering the successive odd numbers into the keyboard in ascending order beginning with the lowest in the range, whereby the count of the subtractions in each series previous to the subtraction during which the overdraft occurs gives a digit of the square root of the number preset in the register.

11. A square root computer according to claim 9 in which said switching means are arranged for entering the successive odd numbers into the keyboard in descending order beginning with the highest in the range whereby the count of the subtractions in each series previous to the subtraction during which the overdraft occurs gives a digit of the complement of the square root of the complement of the number preset in the register.

12. A square root computer according to claim 9 having presettable selecting means for arranging the switching means for entering the odd numbers into the keyboard in ascending order when set in one position and for entering the odd numbers into the keyboard in descending order when set in another position whereby the computer selectively computes the first two digits of the square root of the number preset in the register or the first two digits of the complement of the square root of the complement of the number preset in the register.

13. An electrical control circuit adapted to form a square root computer when combined with a digital calculator having an electrical starting circuit, electrical number circuits for setting up a subtrahend, control means responsive to said starting circuit for causing the calculator to perform a series of subtractions of the subtrahend from a preset minuend ending when an overdraft occurs, to transmit an electrical signal over a first signal circuit during each subtraction, to transmit an electrical signal over a second signal circuit after an overdraft occurs, and to rectify the overdraft by re-adding the last subtrahend after an overdraft occurs, said control system comprising a starting switch, means responsive to said starting switch for energizing selected number circuits for setting up a first subtrahend, means likewise responsive to said starting switch for energizing the starting circuit of the calculator, counting means connected with said first signal circuit for counting said signals over said first signal circuit, switching means controlled by said counting means for energizing preselected number circuits for changing said subtrahend to successive odd numbers between 1 and 19 inclusive between successive subtractions, switching means jointly controlled by said counting means and said second signal circuit for energizing number circuits before and after the addition, said number circuits being preselected in accordance with the number of subtractions in the series, and reconnecting means for resetting said counting means to its initial condition and for reconnecting said switching means with number circuits of a lower decimal order after the addition, in which the reconnecting means comprises a counting chain of relays energizable through a locking circuit, an advancing circuit and a holding circuit, said counting chain comprising an initial stage, at least one intermediate stage, and a final stage, each intermediate stage comprising two relays and said initial and final stages comprising one relay each, the relay of the initial stage and one relay of each intermediate stage being provided with a double-throw switch and a normally open switch, the front contact of all said double-throw switches being connected to the advancing circuit, the back contact of each said double-throw switch except that of the last intermediate stage being connected to the coil of said relay of the next succeeding stage, and the armature of each such double-throw switch being connected to the coil of the relay of the next succeeding stage not connected to the back contact thereof (including the relay of the final stage), one side of all said normally open switches being connected to the holding circuit, the other side of each said normally open switch being connected to the coil of its own relay for self-holding, and the other relay of each intermediate stage and also the relay of the final stage being provided with a double throw switch the front contact of which is connected to the coil of its own relay for self-holding, and all such second-mentioned double-throw switches being connected in series through their back contacts from the armature of the double-throw switch of the final stage which is connected to the locking circuit to the back contact of the said second-mentioned double-throw switch of the first intermediate stage which is connected to the coil of the relay of the initial stage, whereby, while the locking circuit is continuously energized, simultaneous energizing of the holding and advancing circuits for short intervals advances the chain from one stage to the next until the final stage is reached, and the chain energizes the holding circuit between one said short interval and the next except for operating times of relays.

14. In an electrical control circuit for a calculating machine, a counting chain of relays energizable through a locking circuit, an advancing circuit and a holding circuit, said counting chain comprising an inital stage, at least one intermediate stage, and a final stage, each intermediate stage comprising two relays and said initial and final stages comprising one relay each, the relay of the initial stage and one relay of each intermediate stage being provided with a double-throw switch and a normally open switch, the front contact of all said double-throw switches being connected to the advancing circuit, the back contact of each said double-throw switch except that of the last intermediate stage being connected to the coil of said relay of the next succeeding stage, and the armature of each such double-throw switch being connected to the coil of the relay of the next succeeding stage not connected to the back contact thereof (including the relay of the final stage), one side of all said normally open switches being connected to the holding circuit, the other side of each said normally open switch being connected to the coil of its own relay for self-holding, and the other relay of each intermediate stage and also the relay of the final stage being provided with a double-throw switch the front contact of which is connected to the coil of its own relay for self-holding, and all such second-mentioned double-throw switches being connected in series through their back contacts from the armature of the double-throw switch of the final stage which is connected to the locking circuit to the back contact of the said second-mentioned double throw switch of the first intermediate stage which is connected to the coil of the relay of the initial stage, whereby, while the locking circuit is continuously energized, simultaneous energizing of the holding and advancing circuits for short intervals advances the chain from one stage to the next until the final stage is reached, and the chain energizes the holding circuit between one said short interval and the next except for operating times of relays.

15. A square root computer comprising in combination starting means, a mechanical digital calculator having a presettable plural-denomination register, plural-denomination number entry means, and control means responsive to the starting means for causing the calculator to perform a series of subtractions of a subtrahend in the number entry means from a minuend preset in the register ending when an overdraft occurs and to perform an addition after an overdraft occurs for correcting the overdraft, counting means for counting the subtractions in said series, electrical number circuits operatively connected to said number entry means, switching means initially under the control of said starting means and afterward under the control of said counting means for selectively energizing said number circuits according to a predetermined sequential pattern for setting up in two adjacent denominations of the number entry means successive odd numbers in the range between 1 and 19 inclusive before successive subtractions of said series, and means under the joint control of said counting means and said control means for ensuring that the last subtracted number is in the number entry means during the addition for correcting the overdraft, in which said number entry means includes a stepped-tooth gear corresponding to each denomination thereof and two pinions slideable on a non-circular shaft for selectively meshing with different circumferences thereof, said stepped-tooth gear having a group of four adjacent circumferences having two, four, six, and eight teeth respectively with which one pinion is meshable and a group of five adjacent circumferences having one, three, five, seven, and nine teeth respectively with which the second pinion is meshable, and in which said number circuits are operatively connected to said number entry means for sliding said second pinion into mesh with the five circumferences of said second group in rotational sequence during said series of subtractions and for changing the setting of the pinions of the next higher denomination to engage a circumference having a number (including zero) of teeth differing by one from the number of teeth of the circumference engaged before the fifth subtraction of the series.

16. In a square root computing machine, an electrical control circuit for an electrically driven mechanical cyclical calculating machine comprising (1) a starting circuit (2) a guard circuit adapted to be closed only when the control circuit has been relaxed and then energized, (3) a starting relay having a double winding adapted to be energized through one winding via the starting circuit and guard circuit in series, adapted to start a division type of operation on the calculator by transmitting an electrical pulse of predetermined length to the calculator, adapted to be self-holding through the other winding after the calculator has started, whereby a pulse applied over the starting circuit and guard circuit for at least as long as the predetermined length of said pulse to the calculator starts a square root computation, wherein the term "relay" includes relay-and-slave combinations, (4) pulsing means adapted to generate an electrical pulse during each cycle of operation of the calculating machine and an off-beat pulse between each such pulse and the next, (5) switches under the control of the calculator adapted to distribute the pulses over one circuit when the calculator is subtracting and over a second and third circuit respectively during the first and second cycles after an overdraft occurs, (6) stepping means responsive to said one circuit and adapted to be advanced by each said pulse while the calculator is subtracting, (7) number circuits for transmitting numbers to the calculating machine, there being a group of ten circuits in each significant decimal order, respectively corresponding to the ten digits thereof, (8) switches operated by said stepping means for distributing said off-beat pulses over the odd-numbered number circuits in one group in rotational sequence during a series of subtractions, (9) second stepping means initially under the control of the starting relay and afterward under the control of the pulses over said second and third circuits and adapted to connect the said switches on said stepping means initially with a first group of number circuits and with the group of next lower decimal order after the first overdraft.

References Cited in the file of this patent

UNITED STATES PATENTS

| | | |
|---|---|---|
| 1,813,830 | Weiner | July 7, 1931 |
| 2,493,862 | Durfee | Jan. 10, 1950 |
| 2,502,360 | Williams | Mar. 28, 1950 |